US008837053B2

(12) United States Patent
Ishihara et al.

(10) Patent No.: US 8,837,053 B2
(45) Date of Patent: Sep. 16, 2014

(54) ZOOM LENS AND OPTICAL APPARATUS

(75) Inventors: Keiichiro Ishihara, Yokohama (JP);
Masakazu Tohara, Kawasaki (JP)

(73) Assignee: Canon Kabushiki Kaisha (JP)

( * ) Notice: Subject to any disclaimer, the term of this patent is extended or adjusted under 35 U.S.C. 154(b) by 59 days.

(21) Appl. No.: 13/598,725

(22) Filed: Aug. 30, 2012

(65) Prior Publication Data

US 2013/0057962 A1    Mar. 7, 2013

(30) Foreign Application Priority Data

Sep. 2, 2011    (JP) .................................. 2011-191504

(51) Int. Cl.
*G02B 3/00*    (2006.01)
*G02B 9/00*    (2006.01)
*G02B 15/14*    (2006.01)

(52) U.S. Cl.
CPC ..................................... *G02B 15/14* (2013.01)
USPC .......................................... 359/654; 359/652

(58) Field of Classification Search
CPC ....................................................... G02B 3/0087
USPC .......... 359/652–654, 662, 676, 677, 741–743
See application file for complete search history.

(56) References Cited

U.S. PATENT DOCUMENTS

| | | | | | |
|---|---|---|---|---|---|
| 4,976,521 | A | * | 12/1990 | Ishii et al. | 359/654 |
| 5,128,805 | A | * | 7/1992 | Kobayashi | 359/687 |
| 5,184,251 | A | * | 2/1993 | Tsuchida et al. | 359/654 |
| 5,546,229 | A | * | 8/1996 | Aoki | 359/654 |
| 5,703,723 | A | * | 12/1997 | Aoki | 359/654 |
| 5,841,586 | A | * | 11/1998 | Nagaoka | 359/654 |
| 5,973,849 | A | * | 10/1999 | Hashimura | 359/654 |
| 5,999,327 | A | | 12/1999 | Nagaoka | |
| 6,163,411 | A | | 12/2000 | Tsuchida | |
| 6,317,270 | B2 | * | 11/2001 | Nagaoka | 359/684 |
| 2011/0317276 | A1 | * | 12/2011 | Koga | 359/654 |

FOREIGN PATENT DOCUMENTS

| | | |
|---|---|---|
| JP | 09-080304 A | 3/1997 |
| JP | 11-006960 A | 1/1999 |

* cited by examiner

*Primary Examiner* — Thomas K Pham
*Assistant Examiner* — Nicholas Pasko
(74) *Attorney, Agent, or Firm* — Rossi, Kimms & McDowell LLP

(57) ABSTRACT

A zoom lens includes an aperture diaphragm, and a plurality of lens units including a negative lens unit arranged on a light incident side of the aperture diaphragm, the zoom lens being configured to make variable a focal length by changing an interval in the plurality of lens units. The negative lens unit includes a negative lens having a radial type refractive index distribution and a concave surface on the light incident side. The negative lens has a wavelength dispersion distribution in which a differential value is negative on an optical axis of the zoom lens, and the differential value increases at a position that is more distant from the optical axis.

8 Claims, 13 Drawing Sheets

ZOOM LENS AND OPTICAL APPARATUS

BACKGROUND OF THE INVENTION

1. Field of the Invention

The present invention relates to a zoom lens and an optical apparatus.

2. Description of the Related Art

A zoom lens applied to an optical apparatus is required for a smaller size and for corrected chromatic aberrations in a lens unit. For example, a camera can be made smaller by making smaller a zoom lens in a retractable lens barrel so as to reduce the space in the retracted state. On the other hand, there is proposed a radial gradient-index lens that can form a refractive index distribution configured to cancel the chromatic aberration, and the number of lenses can be reduced when this lens is applied.

Japanese Patent Laid-Open No. ("JP") 09-080304 discloses an objective lens in which a variety of aberrations are well corrected with about two lenses in wide angles equal to or larger than an angle of view of 80°. JP 11-006960 discloses a lens system that includes a first lens unit having a negative refractive power and a second lens unit having a positive refractive power, wherein the second lens unit is comprised of a single radial type gradient-index lens having the positive power.

Each lens unit is configured movable in the zoom lens, and a light incident status varies. Therefore, the chromatic aberration cannot be sufficiently corrected only by applying the radial type gradient-index lens to the zoom lens. The optical system of JP 09-080304 assumes an objective lens having a fixed focal length, and does not assume the zoom lens. In the zoom lens disclosed in JP 11-006960, the radial type gradient-index lens in the second lens unit is too thick to shorten the overall length of the optical system when the zoom lens is retracted.

SUMMARY OF THE INVENTION

The present invention provides a zoom lens and an optical apparatus having the same, which can achieve the miniaturization and the correction of chromatic aberration.

A zoom lens according to the present invention includes an aperture diaphragm, and a plurality of lens units including a negative lens unit arranged on a light incident side of the aperture diaphragm. The zoom lens being configured to make variable a focal length by changing an interval among the plurality of lens units. The negative lens unit includes a negative lens having a radial type refractive index distribution and a concave surface on the light incident side. The negative lens has a wavelength dispersion distribution in which a differential value defined by the following expression is negative on an optical axis of the zoom lens, and the differential value increases as a distance from the optical axis increases:

$$\frac{\Delta \partial \Phi_{N,FC}}{\Delta \lambda_{FC}} = \frac{-2(N_{10,F} - N_{10,C}) - 4(N_{20,F} - N_{20,C})r^2 - 6(N_{30,F} - N_{30,C})r^4 - 8(N_{40,F} - N_{40,C})r^6 - \ldots}{\lambda_F - \lambda_C}$$

where a value $\Delta \partial \Phi_{N,FC}/\Delta \lambda_{FC}$ is the differential value, $\lambda_F$ is a wavelength of F-line, $\lambda_C$ is a wavelength of C-line, r is the distance from the optical axis in a radial direction of the negative lens, $N_{10,F}$, $N_{20,F}$, $N_{30,F}$, and $N_{40,F}$ are power series coefficients of the radial type refractive index distribution for the F-line given by the following expression, and $N_{10,C}$, $N_{20,C}$, $N_{30,C}$, and $N_{40,C}$ are power series coefficients of the radial type refractive index distribution for the C-line given by the following expression:

$$N_F(r) = N_{00,F} + N_{10,F}r^2 + N_{20,F}r^4 + N_{30,F}r^6 + N_{40,F}r^8 \ldots$$

$$N_C(r) = N_{00,C} + N_{10,C}r^2 + N_{20,C}r^4 + N_{30,C}r^6 + N_{40,C}r^8 \ldots$$

where $N_{00,F}$ is a refractive index on the optical axis of the negative lens for the F-line, $N_{00,C}$ is a refractive index on the optical axis of the negative lens for the C-line, $N_F(r)$ is the radial type of refractive index distribution for the F-line, and $N_C(r)$ is the radial type of refractive index distribution for the C-line.

Further features of the present invention will become apparent from the following description of exemplary embodiments with reference to the attached drawings.

DESCRIPTION OF THE EMBODIMENTS

Figure 1A:
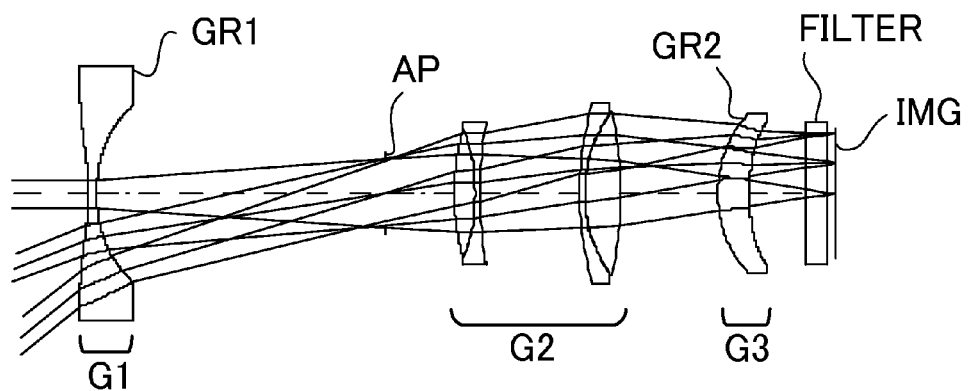
FIGS. 1A to 1C are optical arrangements of a zoom lens according to a first embodiment of the present invention.

This embodiment applies a radial type gradient-index lens having a distribution of the dispersion (which is a nature of a difference of a refractive index of a medium according to wavelengths or the degree of the difference) to a negative lens arranged on the light incident side of an aperture diaphragm in a zoom lens.

The gradient-index lens can be classified into a type in which a refractive index has a distribution, and a type in which the dispersion has a distribution, and the refractive index changes in both of them. The lens in which the dispersion has the distribution is applicable to this embodiment.

The zoom lens includes a plurality of lens units and an aperture diaphragm, and is configured to make variable the focal length by changing intervals among the plurality of lens units. The zoom lens is applicable to an optical apparatus, such as an image pickup apparatus, such as a camera, and a projection unit, such as a projector.

The gradient-index lens is a negative lens having a redial type refractive index distribution. The conventional negative lens unit generally includes a combination of a concave lens and a convex lens. The gradient-index lens contributes to downsizing of the zoom lens because a single lens having a refractive index distribution cancels a chromatic aberration and supersedes the above combination. This gradient-index lens is a negative lens because it is applied to the negative lens unit.

The gradient-index lens has a concave (incident) surface on the light incident side. Although the light flux enters the gradient-index lens obliquely to the optical axis of the zoom lens, the concave incident surface makes the obliquely incident light flux passing the gradient-index lens more closely to a light flux parallel to the optical axis and to pass the radial type dispersion distribution (refractive index distribution). The gradient-index lens of this embodiment demonstrates the best performance to the incident light parallel to the optical axis, and the concave incident surface lessens the influence of the oblique incidence.

Next, the gradient-index lens possesses a wavelength dispersion distribution in which a differential value with the wavelength, of the power (refractive index) per unit thickness in the refractive index distribution is negative on the optical axis (as illustrated by Expression 16 which will be expressed later). This configuration can correct a chromatic aberration generated by the negative lens in which a difference is positive on the optical axis between the power for the C-line and the power for the F-line per unit thickness in the refractive index distribution. The positive difference on the optical axis between the power for the C-line and the power for the F-line per unit thickness in the refractive index distribution means that a differential value is negative.

Next, the gradient-index lens has a wavelength dispersion distribution in which the above differential value increases or becomes close to zero as a distance from the optical axis increases. Since the gradient-index lens becomes thicker from the optical axis to the periphery, this condition mitigates the influence of the thickness difference.

A detailed description will now be given of each embodiment with reference to the accompanying drawings.

First Embodiment

Figure 1B:
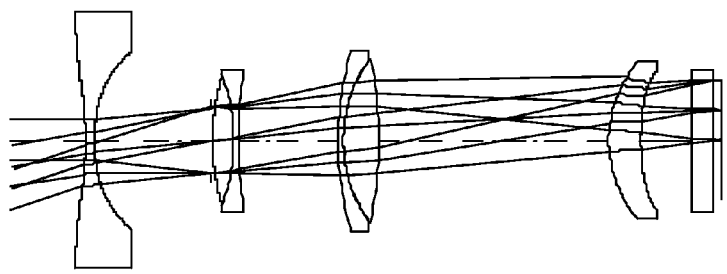
Figure 1C:
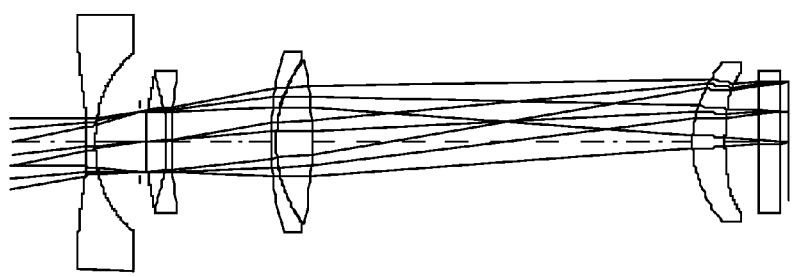

FIGS. 1A-1C illustrate a zoom lens according to a first embodiment at a wide-angle end, in an intermediate range, at a telephoto end. Table 1 illustrates a configuration of the zoom lens according to the first embodiment in which surface numbers 1, 2, 5, and 11 are aspheric surfaces expressed by the following expression:

$$Z = \frac{\frac{Y^2}{R}}{1+\sqrt{1-(1+k)\times\left(\frac{Y}{R}\right)^2}} + AY^4 + BY^6 + CY^8 + DY^{10} \quad \text{Expression 1}$$

wherein R denotes a radius of curvature, K denotes a conic constant, A is a fourth order coefficient, B is a sixth order coefficient, C is an eighth order coefficient, and D is a tenth order coefficient.

The zoom lens introduces a light flux incident at each angle of view to an aperture diaphragm AP via a first lens unit G1 having a negative power so as to limit a light flux width, and forms an image on an image sensing surface IMG, such as a CCD, via a second lens unit G2 and a third lens unit G3 each having a positive power.

Intervals among the first lens unit G1, the aperture diaphragm AP, the second lens unit G2, and the third lens unit G3 are made variable so as to change a focal length between 4.7 mm and 17.0 mm for a 3.6× zoom lens.

Since the intervals among the lens units are varied in the zoom lens when the focal length is changed, each lens unit may have corrected chromatic aberrations. Hence, each lens unit (in particular, a first lens unit and a second lens unit) in a normal zoom lens often includes a combination of a positive lens and a negative lens.

The first lens unit G1 consists of one biconcave lens having a concave incident surface, and a concave exit surface having a larger curvature than that of the incident surface.

The biconcave lens GR1 has a radial type refractive index distribution in which a refractive index decreases as a distance from the optical axis increases and the wavelength dispersion of the refractive index decreases as the distance from the optical axis increases, so as to correct the chromatic aberration in the negative direction which occurs on the incident surface and exit surface of the biconcave lens GR1.

The second lens unit G2 is a cemented lens L23 between the second lens L2 and the third lens L3, and a cemented lens L45 between the fourth lens L4 and the fifth lens L5. The third lens unit G3 consists of one positive meniscus lens in which a convex surface faces the object side. This positive meniscus lens GR2 has a radial type refractive index distribution in which the refractive index increases as a distance from the optical axis increases and the wavelength dispersion of the refractive index increases as the distance from the optical axis increases, so as to correct the chromatic aberration in the positive direction.

Figure 2A:
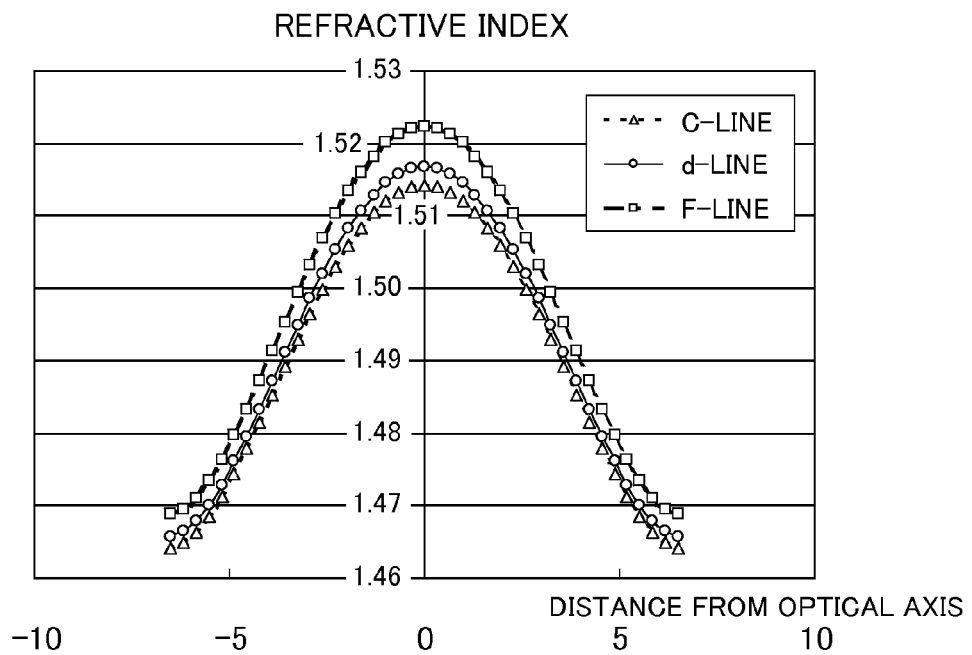
FIGS. 2A and 2B are graphs each illustrating a refractive index distribution shape of a gradient-index lens illustrated in FIGS. 1A to 1C according to the first embodiment.
Figure 2B:
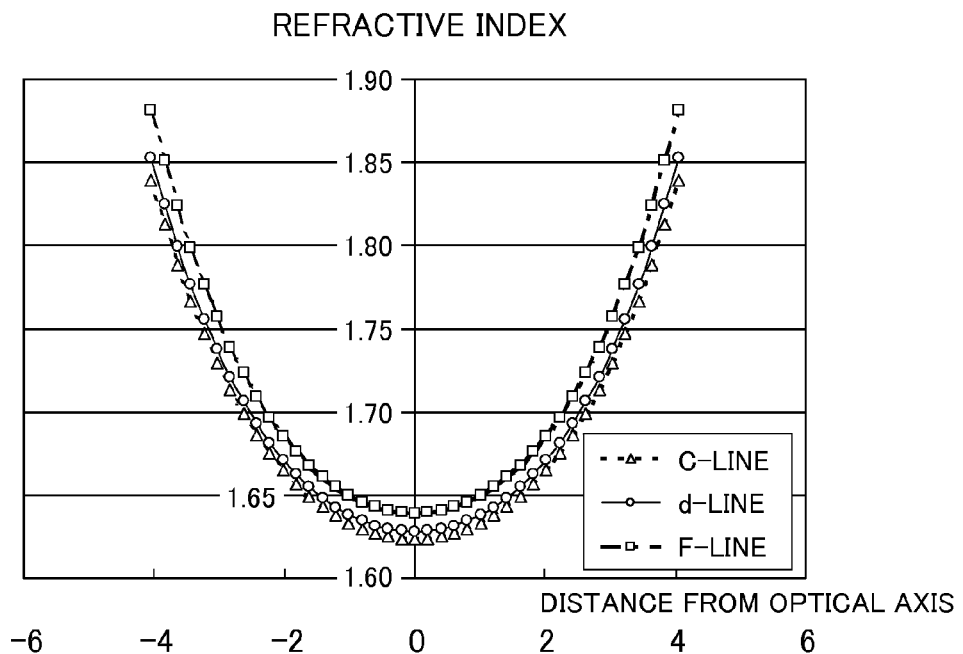

FIG. 2A is a graph illustrating a refractive index distribution shape of the gradient-index lens GR1, and FIG. 2B is a graph illustrating a refractive index distribution shape of the gradient-index lens GR2. In FIGS. 2A and 2B, the abscissa axis denotes a distance from the optical axis, and the ordinate axis denotes a refractive index distribution. As illustrated in FIG. 2A, the gradient-index lens GR1 has a refractive index distribution in which a refractive index of each wavelength (C-line, d-line, and F-line) decreases as a distance from the optical axis increases. The gradient-index lens GR1 having such a refractive index distribution shape is characteristically easy to manufacture.

At this time, a change amount of a refractive index for the F-line on the short wavelength side is configured to be larger than that for the C-line on the long wavelength side so that the refractive index wavelength dispersion in the periphery can become lower than that on the optical axis of the gradient-index lens GR1.

The radial type refractive index distribution and the refractive index wavelength dispersion distribution are formed by blending at least two types of material having different refractive indices and different refractive index wavelength dispersions and by changing a composition ratio in the radial direction of the lens. Due to use of the combination of the low dispersion material and the high dispersion material, a change amount of the refractive index wavelength dispersion can be maintained large.

This embodiment also comprises the gradient-index lens GR1 of the low dispersion material and the high dispersion material so that the composition ratio of the low dispersion material can become high and the composition ratio of the high dispersion material can become low from the optical axis to the periphery.

This configuration can form a wavelength dispersion distribution in which the refractive index wavelength dispersion becomes lower at the periphery than that on the optical axis of the gradient-index lens GR1 so as to correct the chromatic aberrations that occur on the incident surface and the exit surface of the gradient-index lens GR1. In general, many low dispersion materials have low refractive indices, and many high dispersion materials have high refractive indices.

When the refractive index distribution is formed in which the refractive index becomes smaller as a distance from the optical axis increases, the wavelength dispersion distribution can be formed in which the wavelength the refractive index wavelength dispersion becomes lower at the periphery than that on the optical axis of the lens, and a large change amount of the refractive index wavelength dispersion from the optical axis to the periphery can be maintained. At this time, the refractive index distribution may be formed so that at least the refractive index of the d-line can become smaller as a distance from the optical axis increases.

Figure 3:
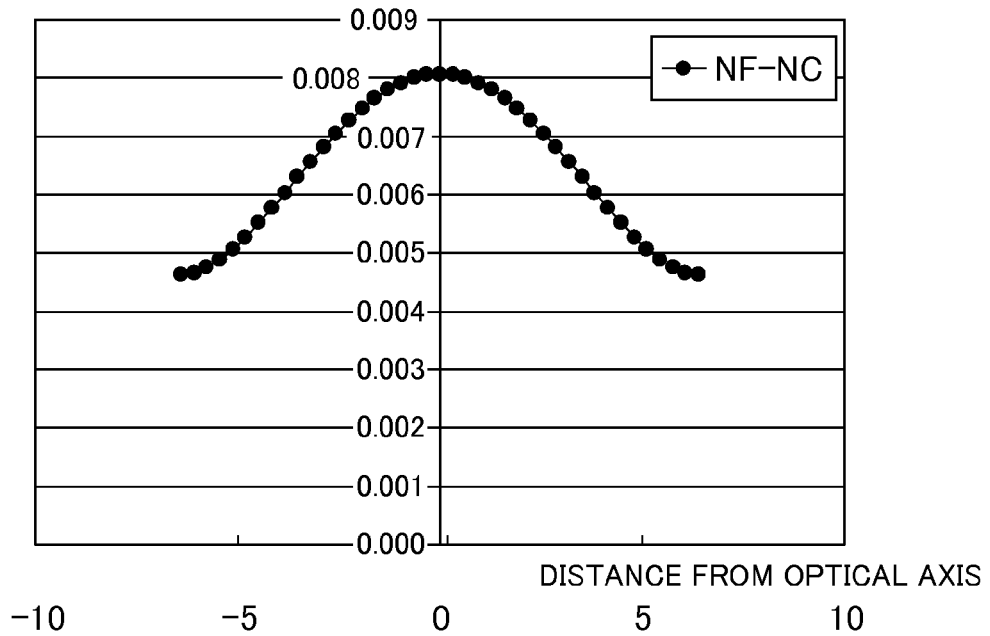
FIG. 3 is a graph illustrating a wavelength dispersion distribution shape of a refractive index of the gradient-index lens illustrated in FIGS. 1A to 1C according to the first embodiment.

FIG. 3 is a graph illustrating a wavelength dispersion distribution shape of the refractive index of the gradient-index lens GR1. As illustrated in FIG. 3, the gradient-index lens GR1 has such a wavelength dispersion distribution of the refractive index that the wavelength dispersion of the refractive index can become smaller as a distance from the optical axis increases.

The radial type refractive index distribution is expressed by the following power series expansion. In this embodiment, the order of the power series expansion is not particularly limited, and the following expression is illustrated with the eighth order for convenience:

$$N(r,\lambda) = N_{00,\lambda} + N_{10,\lambda} r^2 + N_{20,\lambda} r^4 + N_{30,\lambda} r^6 + N_{30,\lambda} r^6 + N_{40,\lambda} r^8 \quad \text{Expression 2}$$

Herein, $N_{00,\lambda}$ is a refractive index of a glass material on the optical axis of the lens GR1 for the light having the wavelength $\lambda$. $N_{10,\lambda}$, $N_{20,\lambda}$, $N_{30,\lambda}$, and $N_{40,\lambda}$ are power series coefficients for the wavelength $\lambda$, and r denotes a distance from the optical axis in the radial direction. The refractive index $N_{00,\lambda}$ on the optical axis and the power series coefficients $N_{10,\lambda}$, $N_{20,\lambda}$, $N_{30,\lambda}$, and $N_{40,\lambda}$ can be set to different values according to wavelengths. The refractive index distributions $N_C(r)$, $N_d(r)$, and $N_F(r)$ are given for the C-line, the d-line, and the F-line:

$$N_C(r) = N_{00,C} + N_{10,C} r^2 + N_{20,C} r^4 + N_{30,C} r^6 + N_{40,C} r^8 \quad \text{Expression 3}$$

$$N_d(r) = N_{00,C} + N_{10,C} r^2 + N_{20,C} r^4 + N_{30,C} r^6 + N_{40,C} r^8 \quad \text{Expression 4}$$

$$N_d(r) = N_{00,d} + N_{10,d} r^2 + N_{20,d} r^4 + N_{30,d} r^6 + N_{40,d} r^8 \quad \text{Expression 5}$$

Herein, an achromatic condition in the gradient-index optical element needs to satisfy the following conditional expression:

$$\frac{\phi_S}{\nu_d} + \frac{\phi_N}{\nu_{10}} = 0 \quad \text{Expression 6}$$

Herein, $\Phi_S$ is a refractive power on the surface shape of the optical element, $\nu_d$ is an Abbe number on the optical axis, $\Phi_N$ is a power in the refractive index distribution, and $\nu_{10}$ is an Abbe number of the refractive index distribution.

The power $\Phi_N$ in the refractive index distribution is expressed as follows:

$$\phi_N = -2d N_{10} \quad \text{Expression 7}$$

Herein, d is a thickness of the optical element. On the other hand, the Abbe number $\nu_{10}$ of the refractive index distribution is expressed as follows:

$$\nu_{10} = \frac{N_{10,d}}{N_{10,F} - N_{10,C}} \quad \text{Expression 8}$$

From Expressions 7 and 8, a term $\Phi_N/\nu_{10}$ of the refractive index distribution of the achromatic condition of Expression 2 can be expressed as follows: This is a difference between the power for the F-line and the power for the C-line in the refractive index distribution.

$$\frac{\phi_N}{\nu_{10}} = -2d(N_{10,F} - N_{10,C}) = \phi_{N,F} - \phi_{N,C} \quad \text{Expression 9}$$

The power of the refractive index distribution is implicated with the thickness d of the optical element, but when the refractive index distribution is formed on the lens having a curvature on the incident surface and the exit surface, the thickness of the optical element changes according to the distances from the optical axis and the power of the refractive index distribution varies accordingly. Expression 10 expresses the power $\Phi_{N,\lambda}(r)$ of the refractive index distribution for each wavelength for the distance r from the optical axis:

$$\phi_{N,\lambda}(r) = -d_r(2N_{10,\lambda} + 4N_{20,\lambda} r^2 + 6N_{30,\lambda} r^4 + 8N_{40,\lambda} r^6 + \dots) \quad \text{Expression 10}$$

Herein, $d_r$ is a thickness of the optical element in the optical axis direction at the distance r from the optical axis. $N_{10,\lambda}$, $N_{20,\lambda}$, $N_{30,\lambda}$, and $N_{40,\lambda}$ are power series coefficients for the wavelength $\lambda$.

In this embodiment, both the incident surface and the exit surface of the gradient-index lens GR1 are concave surfaces, and the thickness $d_r$ of the gradient-index lens GR1 in the optical axis direction increases as a distance from the optical axis increases.

When only the second order term is used for the refractive index distribution, the power of the refractive index distribution is changed in proportion to the thickness $d_r$ in the optical axis direction and the chromatic aberration cannot be properly corrected. Accordingly, the fourth and higher order terms in Expression 2 are used to correct the power changes of the refractive index distribution caused by the change of the thickness in the optical axis direction. This embodiment thus utilizes the fourth order term as the high order term in addition to the second order term as the fundamental structure of the refractive index distribution shape.

Expression 11 represents a difference $\Delta\Phi_{N10,FC}$ between the power for the F-line and the power for the C-line for the second order term in the refractive index distribution, and Expression 12 represents a difference $\Delta\Phi_{N20,FC}$ between the power for the F-line and the power for the C-line for the fourth order term in the refractive index distribution.

$$\Delta\phi_{N10,FC} = -2d_r(N_{10,F} - N_{10,C}) \quad \text{Expression 11}$$

$$\Delta\phi_{N20,FC} = -4d_r(N_{20,F} - N_{20,C})r^2 \quad \text{Expression 12}$$

While the difference $\Delta\Phi_{N10,FC}$ between the power for the F-line and the power for the C-line for the second order term in the refractive index distribution is constant irrespective of the distance r from the optical axis, the difference $\Delta\Phi_{N20,FC}$ between the power for the F-line and the power for the C-line for the fourth order term in the refractive index distribution is variable according to the distance r from the optical axis.

In this embodiment, the difference $\Delta\Phi_{N10,FC}$ between the power for the F-line and the power for the C-line for the second order term in the refractive index distribution is made positive, and the difference $\Delta\Phi_{N20,FC}$ between the power for the F-line and the power for the C-line for the fourth order term in the refractive index distribution is made negative.

The "positive" power means that there is a power to be converged, and the "negative" power means that there is a power to be diverged. The difference $\Delta\Phi_{N10,FC}$ between the power for the F-line and the power for the C-line is positive means that the convergent power for the F-line is stronger than the convergent power for the C-line or the divergent power for the F-line is weaker than the divergent power for the C-line.

This is to cancel an increase of the difference between the power for the F-line and the power for the C-line for the second order term in the refractive index distribution as a result of that the lens becomes thicker as the distance from the optical axis increases, by utilizing the difference between the power for the F-line and the power for the C-line for the fourth order term in the refractive index distribution.

In other words, the difference $\Delta\Phi_{N20,FC}$ between the power for the F-line and the power for the C-line for the fourth order term in the refractive index distribution may have a code reverse to that of the difference $\Delta\Phi_{N10,FC}$ between the power for the F-line and the power for the C-line for the second order term in the refractive index distribution.

Thus, the gradient-index lens GR1 has such a wavelength dispersion distribution that the refractive wavelength dispersion in the periphery is lower than that on the optical axis, and the decreasing degree of the refractive index wavelength dispersion reduces as a distance from the optical axis increases. The above condition may be established for the refractive index wavelength dispersions for at least the F-line and the C-line or for the overall visible range.

Expression 13 represents $\partial\Phi_{N,\lambda}$ that is a power per unit thickness in the refractive index distribution:

$$\partial\phi_{N,\lambda}(r) = -(2N_{10,\lambda} + 4N_{20,\lambda}r^2 + 6N_{30,\lambda}r^4 + 8N_{40,\lambda}r^6 + \ldots) \quad \text{Expression 13}$$

In other words, Expression 13 representing a power $\Delta\Phi_{N,\lambda}$ per unit thickness in the refractive index distribution is made by once differentiating Expression 2 representing the refractive index distribution with the distance r from the optical axis, then by dividing the result by the distance r from the optical axis, and finally by multiplying the result by "−1."

From Expression 10, Expression 14 represents the difference $\Delta\Phi_{N,FC}(r)$ between the power for the F-line and the power for the C-line in the refractive index distribution:

$$\Delta\phi_{N,FC}(r) = -d_r[2(N_{10,F} - N_{10,C}) + 4(N_{20,F} - N_{20,C})r^2 + 6(N_{30,F} - N_{30,C})r^4 + 8(N_{40,F} - N_{40,C})r^6] \quad \text{Expression 14}$$

Expression 15 represents a difference $\Delta\partial\Phi_{N,FC}(r)$ per unit thickness between the power for the F-line and the power for the C-line in the refractive index distribution:

$$\Delta\partial\phi_{N,FC} = -2(N_{10,F} - N^{10,C}) - 4(N_{20,F} - N_{20,C})r^2 - 6(N_{30,F} - N_{30,C})r^4 - 8(N_{40,F} - N_{40,C})r^6 \quad \text{Expression 15}$$

Figure 4:
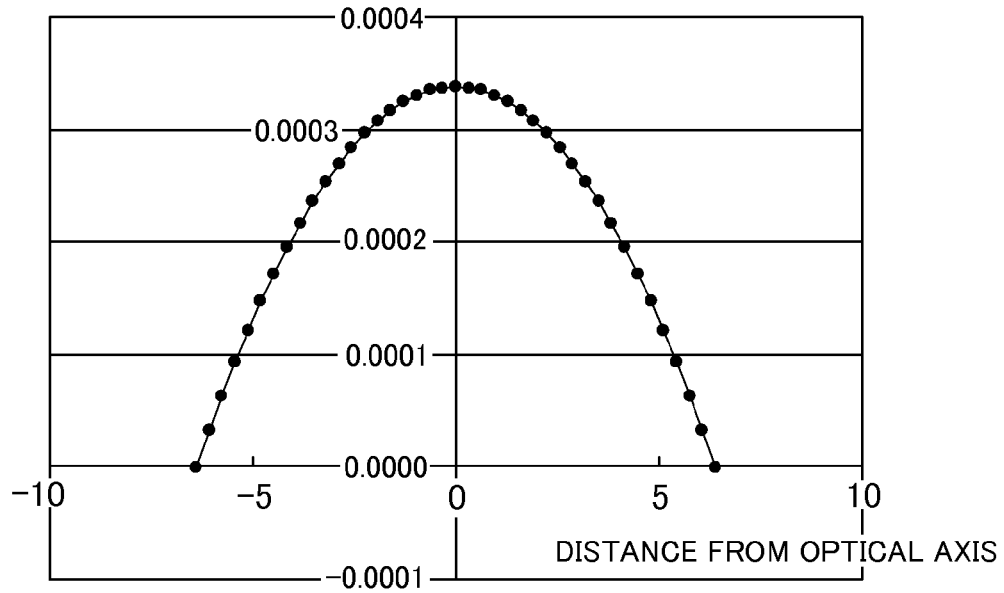
FIG. 4 is a graph illustrating a refractive index distribution power difference per unit thickness of the gradient-index lens illustrated in FIGS. 1A to 1C according to the first embodiment.

FIG. 4 is a graph illustrating the difference per unit thickness between the power for the F-line and the power for the C-line in the refractive index distribution of the gradient-index lens GR1. On the optical axis, the difference per unit thickness is positive between the power for the F-line and the power for the C-line in the refractive index distribution, and it gradually decreases as a distance from the optical axis increases.

As described above, the difference per unit thickness is constant for the second order term between the power for the F-line and the power for the C-line in the refractive index distribution, and a chromatic aberration is generated in the positive direction by setting the value of the difference to a positive value.

When the fourth order term is added, the difference per unit thickness between the power for the F-line and the power for the C-line in the refractive index distribution can be changed by the distance from the optical axis, so as to adjust thickness changes of the lens in the optical axis direction.

This embodiment sets the code of the fourth order term to a reverse code to that of the second order term so as to reduce the difference per unit thickness between the power for the F-line and the power for the C-line in the refractive index distribution as the distance from the optical axis increases.

As the distance from the optical axis increases, the difference per unit thickness between the power for the F-line and the power for the C-line in the refractive index distribution increases which is caused by the increased thickness of the concave lens. The chromatic aberration is properly corrected by cancelling this difference utilizing the wavelength dispersion distribution in which the difference per unit thickness between the power for the F-line and the power for the C-line in the refractive index distribution decreases.

In particular, when the difference per unit thickness is provided between the power for the F-line and the power for the C-line in the refractive index distribution, which is equivalent between the principal ray and the marginal ray, the longitudinal chromatic aberration can be corrected without generating a spherical aberration of the color.

In addition, a lateral chromatic aberration can be corrected for a light flux having an angle of view without generating a curvature of field. The difference per unit thickness between the power for the F-line and the power for the C-line in the refractive index distribution can be replaced with a differential value with a wavelength, of the power per unit thickness in the refractive index distribution.

From Expression 15, Expression 16 represents a differential value $\Delta\partial\Phi_{N,FC}/\Delta\lambda_{FC}$ with the wavelength, of the power per unit thickness in the refractive index distribution:

$$\frac{\Delta\partial\Phi_{N,FC}}{\Delta\lambda_{FC}} = \frac{-2(N_{10,F} - N_{10,C}) - 4(N_{20,F} - N_{20,C})r^2 - 6(N_{30,F} - N_{30,C})r^4 - 8(N_{40,F} - N_{40,C})r^6 - \ldots}{\lambda_F - \lambda_C}$$

Expression 16

Herein, $\lambda_F$ is a wavelength of the F-line, and $\lambda_F=486.13$ nm. $\lambda_C$ is a wavelength of the C-line, and $\lambda_C=656.27$ nm. As described above, $N_{10,F}$, $N_{20,F}$, $N_{30,F}$, and $N_{40,F}$ are power series coefficients of the radial type refractive index distribution for the F-line. $N_{10,C}$, $N_{20,C}$, $N_{30,C}$, and $N_{40,C}$ are power series coefficients of the radial type refractive index distribution for the C-line. $N_{00,F}$ is a refractive index on the optical axis for the F-line, $N_{00,C}$ is a refractive index on the optical axis for the C-line, $N_F(r)$ is the radial type refractive index distribution for the F-line, and $N_C(r)$ is the radial type refractive index distribution for the C-line.

On the optical axis, r=0, a denominator is negative, a numerator is positive, and thus a differential value is negative (minus). Making positive the difference per unit thickness between the power for the F-line and the power for the C-line in the refractive index distribution on the optical axis means making negative the differential value with the wavelength, of the power per unit thickness in the refractive index distribution, and the chromatic aberration that occurs in the negative direction can be corrected.

The gradient-index lens GR1 has a wavelength dispersion distribution in which the differential value with the wavelength, of the power per unit thickness in the refractive index distribution increases as the distance from the optical axis increases. Since the numerator in Expression 16 decreases as the position separates from the optical axis and approaches to the periphery, the differential value approaches to zero. Thereby, the correction effect of the chromatic aberration per unit thickness that occurs in the negative direction is reduced so as to cancel the influence of the increased thickness of the concave lens with the intended correction of the chromatic aberration.

Thus, the chromatic aberration can be highly precisely corrected even in the concave lens when the lens has a wavelength dispersion distribution in which the differential value with the wavelength, of the power per unit thickness in the refractive index distribution is negative on the optical axis, and the differential value increases as the distance from the optical axis increases. Of course, the wavelength dispersion distribution in which the differential value increases as described above may be formed in an effective region (or light transmitting region) which the light passes in the optical element (such as a lens and a glass plate). In other words, the differential value may not increase outside the light transmitting area, for example, part in which the optical element is adhered to or held by the holding frame etc.

Figure 5:
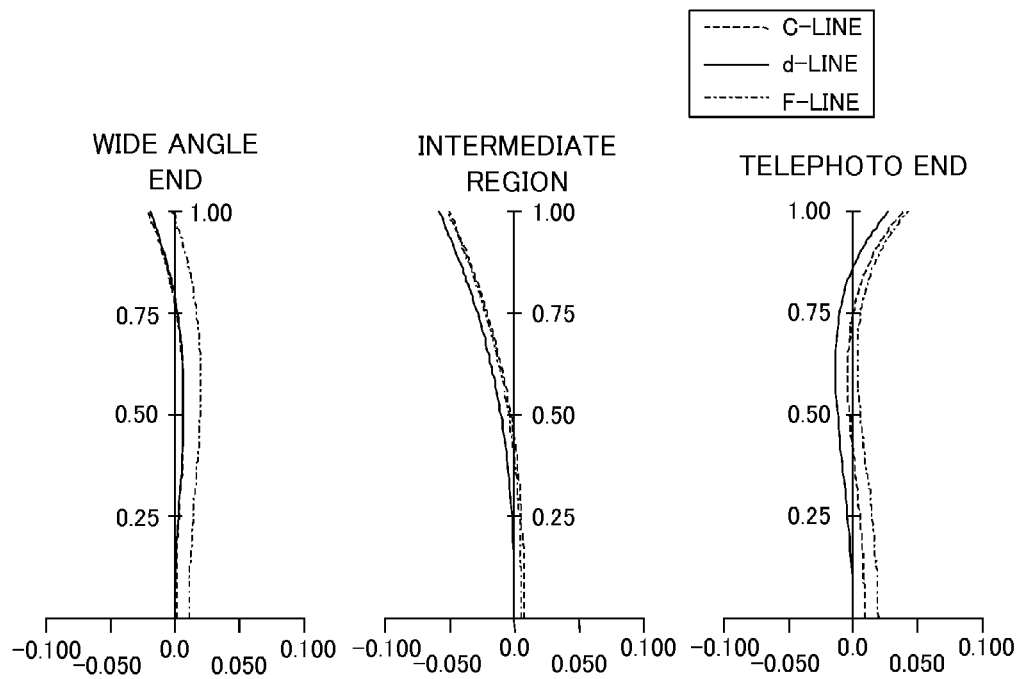
FIG. 5 illustrates longitudinal aberrational diagrams of the zoom lens illustrated in FIGS. 1A-1C according to the first embodiment.

FIG. 5 illustrates longitudinal aberration diagrams of the zoom lens according to this embodiment at the wide-angle end, in the intermediate range, and at the telephoto end. As illustrated in FIG. 5, the longitudinal chromatic aberration is well corrected at any zoom positions while the spherical aberration of the color is restrained.

Figure 6:
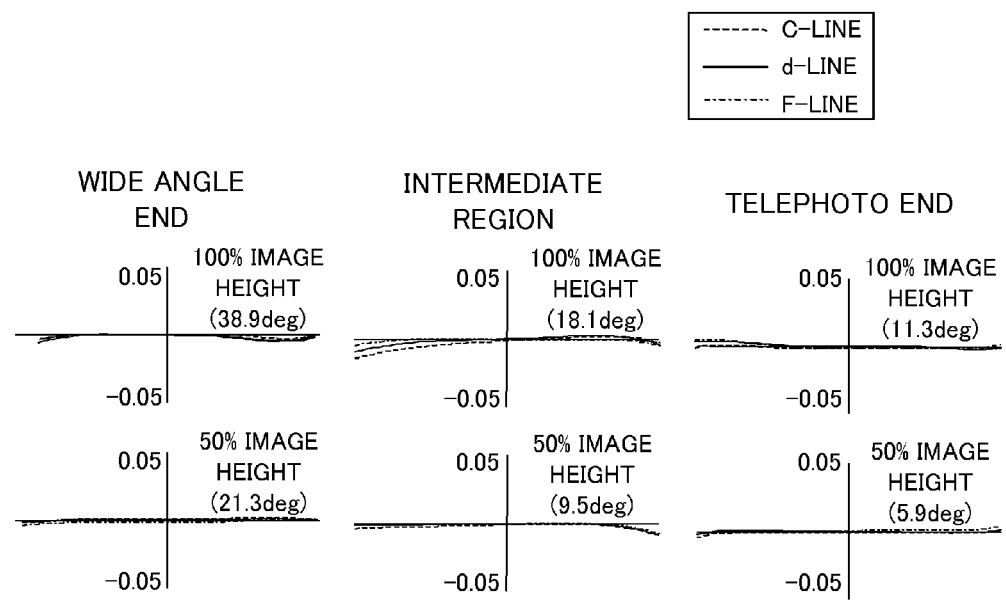
FIG. 6 illustrates transverse aberrational diagrams of the zoom lens illustrated in FIGS. 1A-1C according to the first embodiment.

FIG. 6 illustrates transverse aberration diagrams of the zoom lens according to this embodiment at the wide-angle end, in the intermediate range, and at the telephoto end. The lateral chromatic aberration is well corrected at each image height, while the curvature of field of the color is restrained. Thereby, an intended difference between the power for the F-line and the power for the C-line in the refractive index distribution can be obtained even in the gradient-index lens in which the thickness partially changes, and the chromatic aberration can be properly corrected.

This embodiment provides a concave incident surface, and a concave exit surface that has curvature larger than that of the incident surface. In the negative lens unit arranged just before the aperture diaphragm, the exit surface has a large curvature so as to provide the exit surface with a main power of the negative lens unit. The concave exit surface is concentric, and thus the configuration becomes less likely to cause the coma etc. for the light flux.

On the other hand, the concave incident surface can make close to parallel to the optical axis the light flux upon the gradient-index lens from a wide angle of view, and the incident angle upon the radial type refractive index distribution formed in the lens can be made gentle.

The radial type refractive index distribution depends upon the incident angle, but the concave incident angle can alleviate its influence and can maintain proper optical performance for the wide angle of view.

This embodiment can highly precisely correct the chromatic aberration even in the concave lens that has a large amount of the thickness changes by setting the code of the difference between the power for the F-line and the power for the C-line for the high order term in the refractive index distribution reverse to the code of the difference between the power for the F-line and the power for the C-line for the second order term in the refractive index distribution.

Since the gradient-index lens can correct the chromatic aberrations generated on the incident surface and the exit surface of the lens, by utilizing the wavelength dispersion distribution, the chromatic aberrations can be properly corrected even with a single lens that is the gradient-index lens. While the conventional negative lens unit arranged just before the aperture diaphragm usually needs two to three lenses, this embodiment enables the negative lens unit to consist of a single lens when it uses a gradient-index lens.

An overall length of the optical system in the retracted state can be reduced by reducing the number of lenses and by reducing a space of an air lens between the concave lens and the convex lens. Thus, when the negative unit includes a single gradient-index lens, the chromatic aberration can be appropriately corrected and the zoom lens becomes compact in the retraction state.

TABLE 1

OPTICAL CONFIGURATION

| configuration | Surface Number | Surface Shape | Radius of Curvature | Interval between Surfaces | Refractive Index Nd | Abbe Number Vd |
|---|---|---|---|---|---|---|
| First Lens Unit | 1 | aspheric | −13.7839 | 0.500 | GR1 | |
| | 2 | aspheric | 10.4226 | variable d2 | Air | |

TABLE 1-continued

| | | | | | | |
|---|---|---|---|---|---|---|
| Aperture Diaphragm | 3 | spherical | plane | variable d3 | | Air |
| Second Lens Unit | 4 | spherical | 14.2872 | 1.231 | 1.86379 | 41.8 |
| | 5 | aspheric | −11.1533 | 0.300 | 1.73579 | 27.5 |
| | 6 | spherical | 28.0973 | 5.894 | | Air |
| | 7 | spherical | 19.1007 | 0.300 | 1.81851 | 30.5 |
| | 8 | spherical | 8.2028 | 2.121 | 1.68379 | 43.4 |
| | 9 | spherical | −24.2632 | variable d9 | | Air |
| Third Lens Unit | 10 | spherical | 7.0794 | 1.900 | | GR2 |
| | 11 | aspheric | 16.2715 | variable d11 | | Air |
| Filter | 12 | spherical | plane | 1.300 | 1.51633 | 64.14 |
| | 13 | spherical | plane | 0.500 | | Air |
| Image Plane | 14 | spherical | plane | | | |

VARIABLE SURFACE INTERVAL

| Surface Interval Number | Wide-angle End | Intermediate region | Telephoto End |
|---|---|---|---|
| d2 | 17.098 | 6.937 | 2.704 |
| d3 | 4.120 | 0.100 | 0.270 |
| d9 | 5.781 | 13.633 | 22.560 |
| d11 | 3.262 | 2.979 | 1.970 |

MATERIAL

| Material Name | Refractive Index Distrib. Coeffi. | wavelength | | |
|---|---|---|---|---|
| | | C-Line: 656.27 nm | d-Line: 587.56 nm | F-Line: 486.13 nm |
| GR1 | N00 | 1.51431 | 1.51680 | 1.52238 |
| | N10 | −0.2312E−02 | −0.2360E−02 | −0.2481E−02 |
| | N20 | 0.2665E−04 | 0.2724E−04 | 0.2872E−04 |
| GR2 | N00 | 1.62355 | 1.62797 | 1.63903 |
| | N10 | 0.9221E−02 | 0.9528E−02 | 0.1021E−01 |
| | N20 | 0.2428E−03 | 0.2552E−03 | 0.2801E−03 |

ASPHERIC SHAPE

| Surface Number | K | A | B | C | D |
|---|---|---|---|---|---|
| 1 | −12.1375 | 5.9634E−04 | −1.2747E−05 | 1.5578E−07 | −8.2055E−10 |
| 2 | 1.3938 | 1.0130E−03 | −6.6604E−06 | 1.8373E−07 | −9.7667E−09 |
| 5 | 0.4312 | −1.5644E−04 | 3.5133E−06 | −2.2164E−07 | 4.6332E−09 |
| 11 | −0.9844 | 9.1802E−04 | 1.9279E−05 | 7.4818E−07 | 0.0000E+00 |

FOCAL LENGTH

| Focal length | Wide-angle end | Intermediate region | Telephoto end |
|---|---|---|---|
| f | 4.7 mm | 10.7 mm | 17.0 mm |

Second Embodiment

Figure 7A:
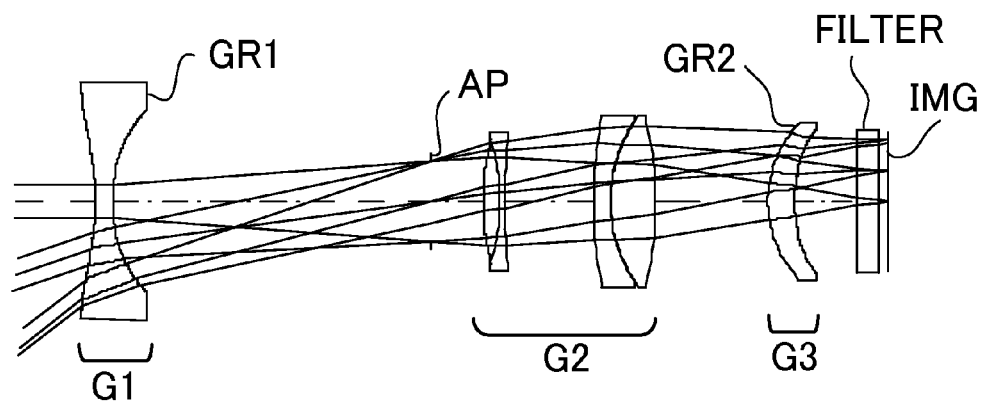
FIGS. 7A to 7C are optical arrangements of a zoom lens according to a second embodiment of the present invention.
Figure 7B:
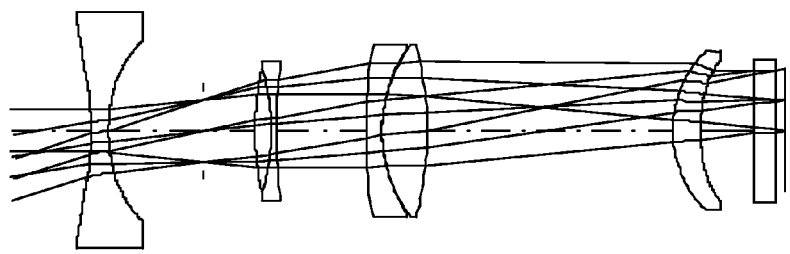
Figure 7C:
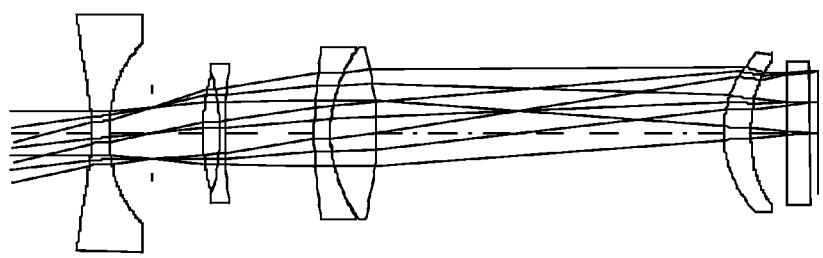

FIGS. 7A-7C illustrate a zoom lens according to a second embodiment at a wide-angle end, an intermediate range, and a telephoto end. Table 2 illustrates the zoom lens according to the second embodiment where surface number 1, 2, 5, and 11 are aspheric surfaces expressed by Expression 1.

The zoom lens introduces a light flux incident at each angle of view to an aperture diaphragm AP via a first lens unit G1 having a negative power so as to limit a light flux width, and forms an image on an image sensing surface IMG via a second lens unit G2 and a third lens unit G3 each having a positive power.

Intervals among the first lens unit G1, the aperture diaphragm AP, the second lens unit G2, and the third lens unit G3 are made variable so as to change a focal length between 5.2 mm and 14.6 mm for a 2.8× zoom lens.

The first lens unit G1 consists of one biconcave lens having a concave incident surface, and a concave exit surface having a larger curvature than that of the incident surface. Similar to the first embodiment, the biconcave lens GR1 has a radial type refractive index distribution in which the refractive index decreases as a distance from the optical axis increases and the wavelength dispersion of the refractive index decreases as a distance from the optical axis increases.

Figure 8A:
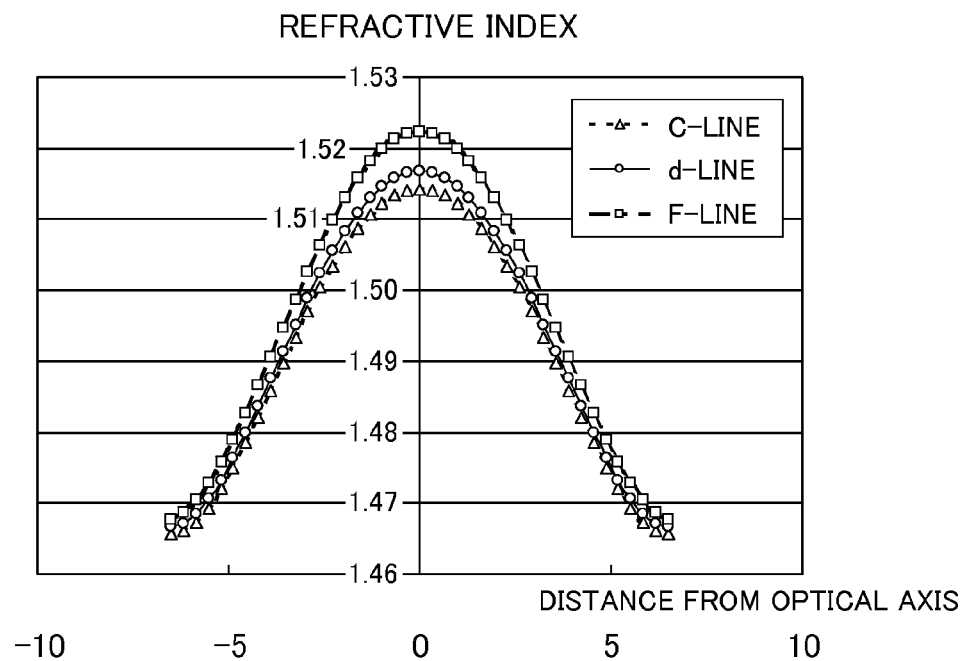
FIGS. 8A and 8B are graphs each illustrating a refractive index distribution shape of a gradient-index lens illustrated in FIGS. 7A to 7C according to the second embodiment.
Figure 8B:
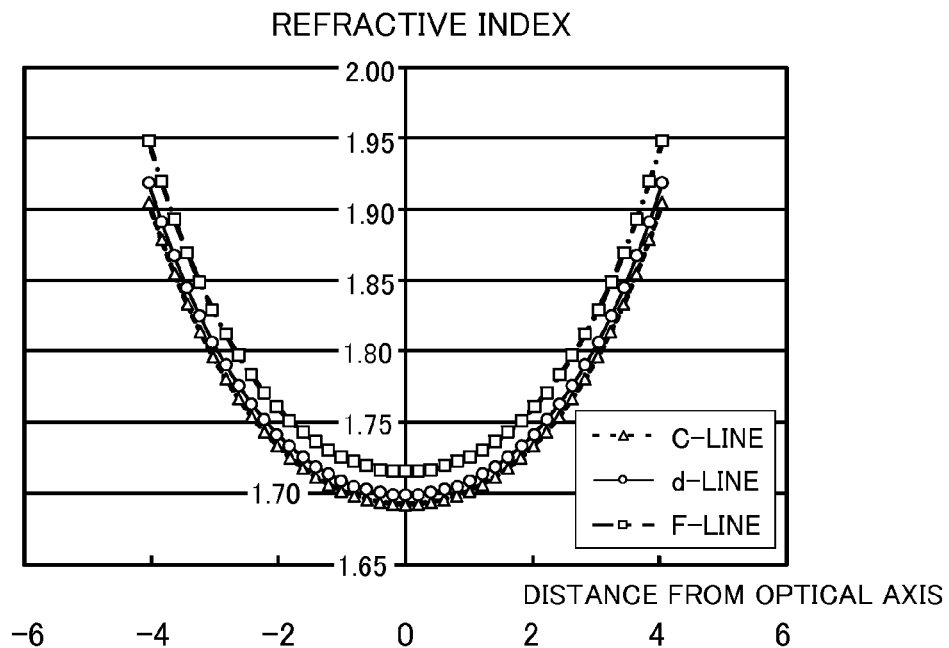
Figure 9A:
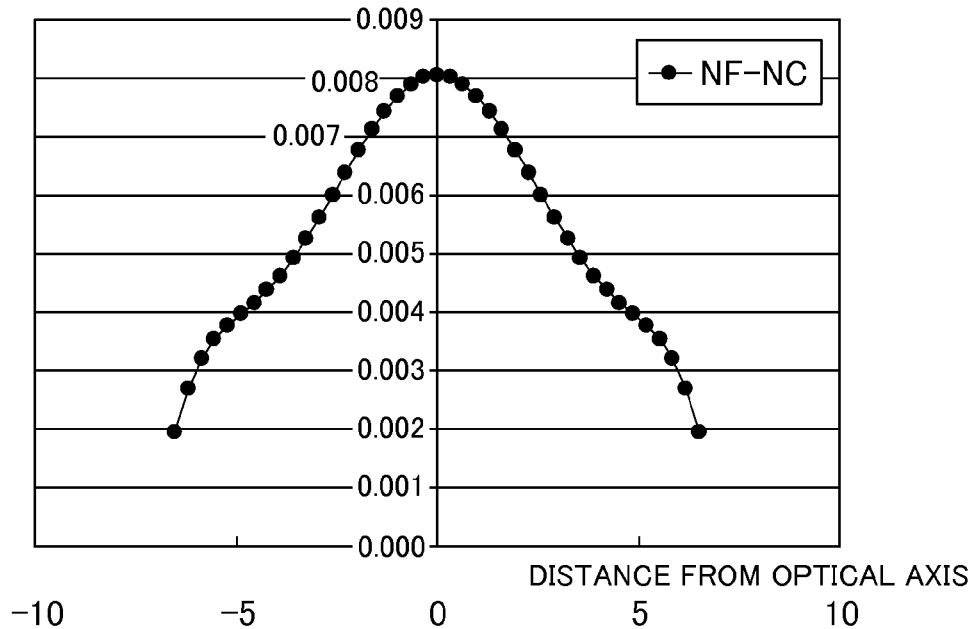
FIGS. 9A and 9B are graphs each illustrating a wavelength dispersion distribution shape of a refractive index of the gradient-index lens illustrated in FIGS. 7A to 7C according to the second embodiment.
Figure 9B:
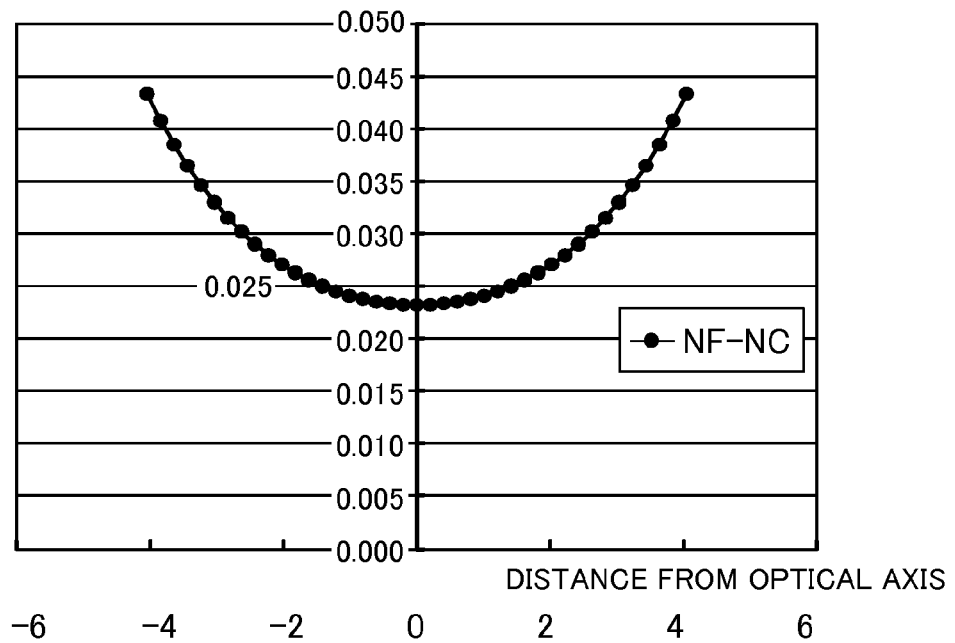

FIG. 8A is a graph illustrating a refractive index distribution shape of the gradient-index lens GR1, and FIG. 8B is a graph illustrating a refractive index distribution shape of the gradient-index lens GR2. FIG. 9A is a graph illustrating a wavelength dispersion distribution shape of the refractive index of the gradient-index lens GR1. FIG. 9B is a graph illustrating a wavelength dispersion distribution shape of the refractive index of the gradient-index lens GR2. FIGS. 8A and 8B are similar to FIGS. 2A and 2B of the first embodiment, and it is also similar to the first embodiment that a change amount of the refractive index of the F-line on the long wavelength side is larger than the C-line on the short wavelength side in FIG. 9A.

The second lens unit G2 is a cemented lens L23 between the second lens L2 and the third lens L3, and a cemented lens L45 between the fourth lens L4 and the fifth lens L5.

The third lens unit G3 consists of one positive meniscus lens in which a convex surface faces the object side. This positive meniscus lens GR2 has a radial type refractive index distribution in which the refractive index for each wavelength (the C-line, the d-line, and the F-line) increases as a distance from the optical axis increases, as illustrated in FIG. 8B, and the wavelength dispersion of the refractive index increases as a distance from the optical axis increases, as illustrated in FIG. 9B, so as to correct the chromatic aberration in the positive direction.

This embodiment expresses the refractive index distribution shape of the gradient-index lens GR1 utilizing Expression 2 up to the sixth order term. The difference $\Delta\Phi_{N10,FC}$ between the power for the F-line and the power for the C-line for the second order term in the refractive index distribution is as illustrated in Expression 11. The difference $\Delta\Phi_{N10,FC}$ between the power for the F-line and the power for the C-line for the fourth order term in the refractive index distribution is as illustrated in Expression 12. Expression 17 represents a difference $\Delta\Phi_{N30,FC}$ between the power for the F-line and the power for the C-line for the sixth order term in the refractive index distribution:

$$\Delta\phi_{N30,FC} = -6d_r(N_{30,F} - N_{30,C})r^4 \quad \text{Expression 17}$$

The difference $\Delta\Phi_{N10,FC}$ between the power for the F-line and the power for the C-line for the second order term in the refractive index distribution, which is caused by the thickness changes of the gradient-index lens GR1, is corrected by the difference $\Delta\Phi_{NH,FC}$ between the power for the F-line and the power for the C-line for high order terms (such as the fourth and sixth terms) in the refractive index distribution.

Expression 18 represents the difference $\Delta\Phi_{NH,FC}$ between the power for the F-line and the power for the C-line for the high order terms (fourth and sixth terms) in the refractive index distribution of this embodiment:

$$\Delta\phi_{NH,FC} = -4d_r(N_{20,F} - N_{20,C})r^2 - 6d_r(N_{30,F} - N_{30,C})r^4 \quad \text{Expression 18}$$

Since the gradient-index lens GR1 becomes thicker as the distance from the optical axis increases, the difference $\Delta\Phi_{NH,FC}$ between the power for the F-line and the power for the C-line for the high order terms (fourth and sixth terms) in the refractive index distribution decreases as the distance from the optical axis increases. This configuration corrects the influences of the thickness changes.

Figure 10:
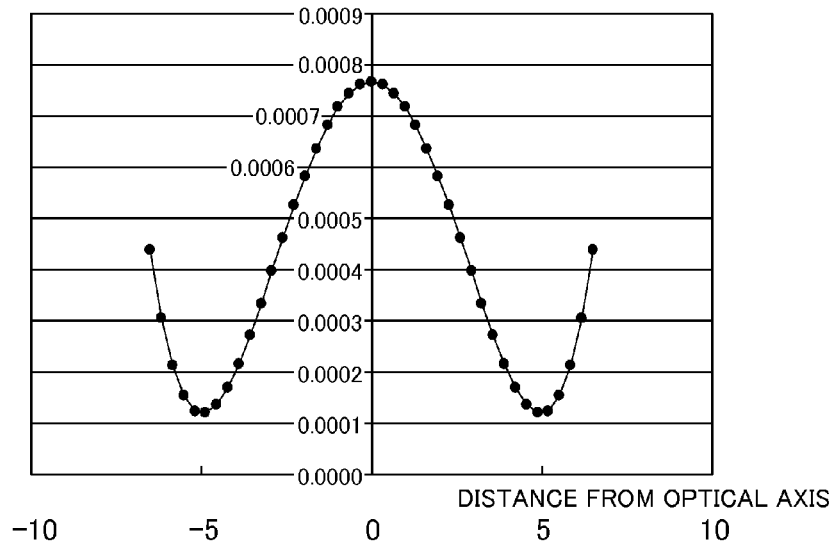
FIG. 10 is a graph illustrating a refractive index distribution power difference per unit thickness of the gradient-index lens illustrated in FIGS. 7A to 7C according to the second embodiment.

FIG. 10 is a graph illustrating the difference per unit thickness between the power for the F-line and the power for the C-line in the refractive index distribution of the gradient-index lens GR1. On the optical axis, the difference per unit thickness between the power for the F-line and the power for the C-line in the refractive index distribution is made positive so as to generate the chromatic aberration in the positive direction, and to correct the chromatic aberration that occurs in the negative direction in the first lens unit G1.

The difference per unit thickness between the power for the F-line and the power for the C-line in the refractive index distribution gradually reduces as a distance from the optical axis increases so as to correct the influences of the thickness changes of the concave shape of the gradient-index lens GR1.

Thus, the difference per unit thickness between the power for the F-line and the power for the C-line in the refractive index distribution is made positive on the optical axis and the difference per unit thickness between the power for the F-line and the power for the C-line in the refractive index distribution is reduced as the distance from the optical axis increases. Thereby, the chromatic aberration is highly precisely corrected without being influenced by the thickness changes of the concave lens.

Making positive the difference per unit thickness on the optical axis between the power for the F-line and the power for the C-line in the refractive index distribution means making negative the differential value with the wavelength, of the power per unit thickness in the refractive index distribution and the wavelength, and the chromatic aberration that occurs in the negative direction can be corrected.

Due to the wavelength dispersion distribution in which the differential value with the wavelength, of the power per unit thickness in the refractive index distribution increases as the distance from the optical axis increases, the correction effect of the chromatic aberration per unit thickness that occurs in the negative direction is reduced, so as to cancel the influence of the increased thickness of the concave lens with the intended correction of the chromatic aberration.

Figure 11:
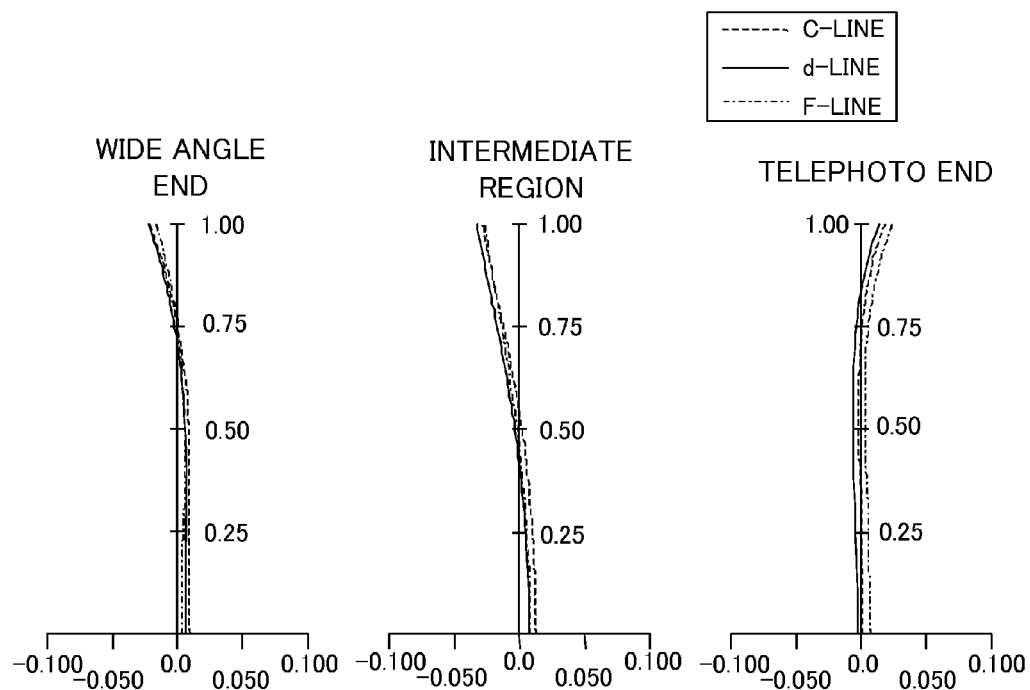
FIG. 11 illustrates longitudinal aberrational diagrams of the zoom lens illustrated in FIGS. 7A-7C according to the second embodiment.

FIG. 11 is longitudinal aberration diagrams of the zoom lens according to this embodiment at the wide-angle end, in the intermediate range, and at the telephoto end. As illustrated in FIG. 11, the longitudinal chromatic aberration is well corrected at any zoom positions while the spherical aberration of the color is restrained.

Figure 12:
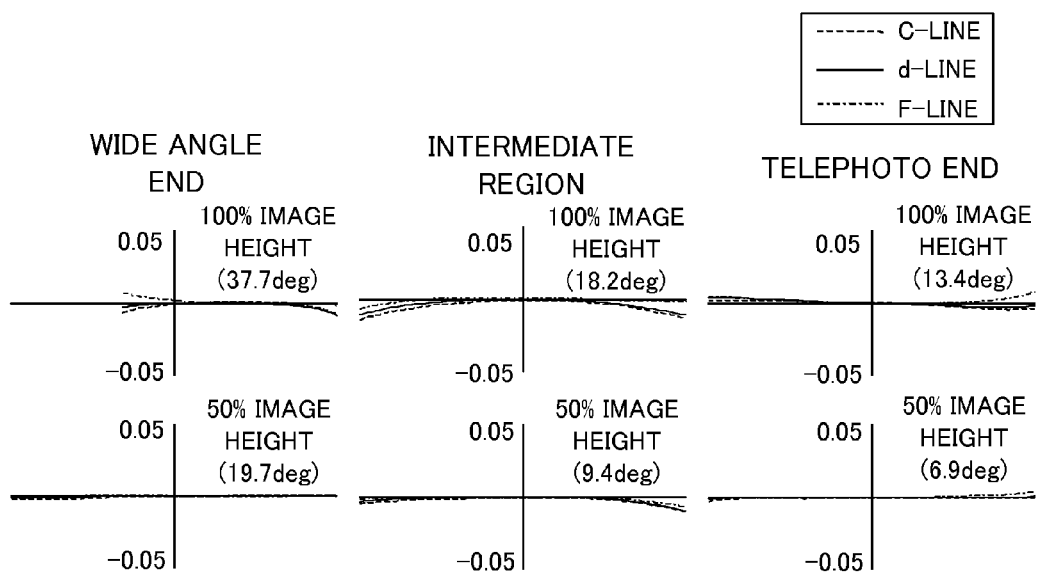
FIG. 12 illustrates transverse aberrational diagrams of the zoom lens illustrated in FIGS. 7A-7C according to the second embodiment.

FIG. 12 illustrates transverse aberration diagrams of the zoom lens according to this embodiment at the wide-angle end, in the intermediate range, and at the telephoto end. As illustrated, the lateral chromatic aberration is well corrected at each image height, while the curvature of field of the color is restrained.

Thus, according to this embodiment, the negative lens included in the negative lens unit in the zoom lens adjacent to the aperture diaphragm on the light incident side can properly correct the longitudinal chromatic aberration, the lateral chromatic aberration, the spherical aberration of the color, and the curvature of field of the color, even when there is only one negative lens.

Thereby, while the negative lens unit in the usual zoom lens adjacent to the light incident side of the aperture diaphragm requires a plurality of lenses, only one negative lens is enough. As a result, the thickness in the retracted state can be remarkably reduced. Moreover, the thickness of the body of the image pickup apparatus can be remarkably reduced:

TABLE 2

| configuration | Surface Number | Surface Shape | Radius of Curvature | Interval between Surfaces | Refractive Index Nd | Abbe Number Vd |
|---|---|---|---|---|---|---|
| First Lens Unit | 1 | aspheric | −12.0788 | 1.022 | GR1 | |
| | 2 | aspheric | 11.7841 | variable d2 | Air | |

TABLE 2-continued

| | | | | | | |
|---|---|---|---|---|---|---|
| Aperture Diaphragm | 3 | spherical | plane | 3.007 | | Air |
| Second Lens Unit | 4 | spherical | 14.5179 | 0.947 | 1.86373 | 41.8 |
| | 5 | aspheric | −12.7303 | 0.300 | 1.73587 | 27.7 |
| | 6 | spherical | 34.5275 | 5.194 | | Air |
| | 7 | spherical | 29.1739 | 0.968 | 1.81860 | 31.5 |
| | 8 | spherical | 8.4800 | 2.615 | 1.68378 | 50.7 |
| | 9 | spherical | −20.0807 | variable d9 | | Air |
| Third Lens Unit | 10 | spherical | 6.4862 | 1.583 | | GR2 |
| | 11 | aspheric | 9.9484 | variable d11 | | Air |
| Filter | 12 | spherical | plane | 1.300 | 1.51633 | 64.14 |
| | 13 | spherical | plane | 0.500 | | Air |
| Image Plane | 14 | spherical | plane | | | |

VARIABLE SURFACE INTERVAL

| Surface Interval Number | Wide-angle End | Intermediate region | Telephoto End |
|---|---|---|---|
| d2 | 18.529 | 5.470 | 2.468 |
| d9 | 6.505 | 14.296 | 20.218 |
| d11 | 3.612 | 3.120 | 2.100 |

MATERIAL

| | Refractive Index | wavelength | | |
|---|---|---|---|---|
| Material Name | Distrib. Coeffi. | C-Line: 656.27 nm | d-Line: 587.56 nm | F-Line: 486.13 nm |
| GR1 | N00 | 1.514322 | 1.516800 | 1.522376 |
| | N10 | −0.2223E−02 | −0.2317E−02 | −0.2606E−02 |
| | N20 | 0.2223E−04 | 0.2524E−04 | 0.3526E−04 |
| | N30 | 0.7475E−07 | 0.3529E−07 | −0.1002E−06 |
| GR2 | N00 | 1.692224 | 1.698947 | 1.715424 |
| | N10 | 0.9160E−02 | 0.9448E−02 | 0.1001E−01 |
| | N20 | 0.2347E−03 | 0.2432E−03 | 0.2577E−03 |

ASPHERIC SHAPE

| Surface Number | K | A | B | C | D |
|---|---|---|---|---|---|
| 1 | −8.8117 | 5.3270E−04 | −1.2880E−05 | 1.6251E−07 | −8.2014E−10 |
| 2 | 2.7266 | 9.8728E−04 | −9.0245E−06 | −1.1532E−07 | −6.7435E−09 |
| 5 | 0.6530 | −1.4085E−04 | 1.1227E−06 | −9.9168E−08 | 3.4715E−09 |
| 11 | −2.0695 | 8.9339E−04 | 2.1734E−05 | 5.0173E−07 | 0.0000E+00 |

FOCAL LENGTH

| Focal length | Wide-angle end | Intermediate region | Telephoto end |
|---|---|---|---|
| f | 5.2 mm | 10.8 mm | 14.6 mm |

Third Embodiment

Figure 13A:
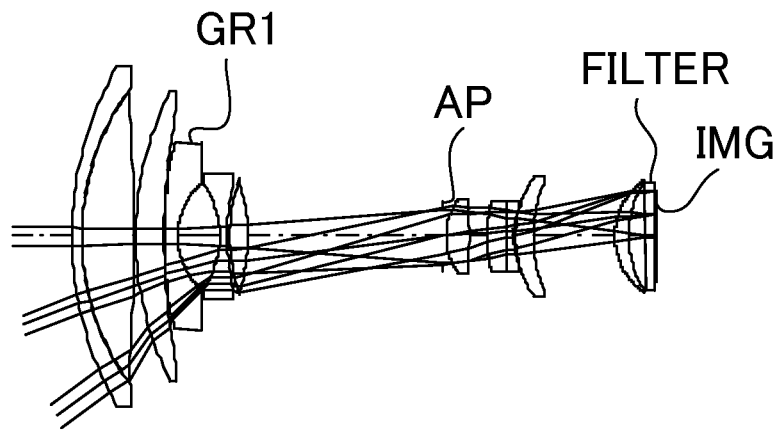
FIGS. 13A to 13C are optical arrangements of a zoom lens according to a third embodiment of the present invention.
Figure 13B:
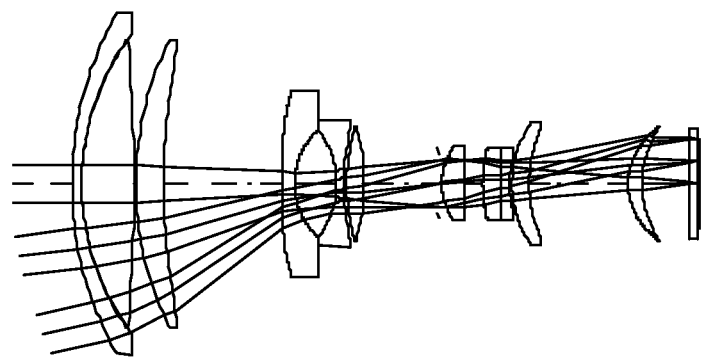
Figure 13C:
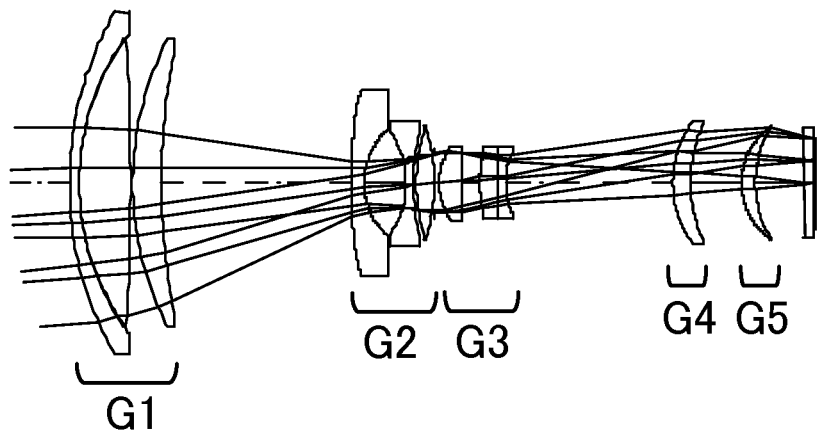

FIGS. 13A-13C illustrate a zoom lens according to a third embodiment at a wide-angle end, in intermediate range, and a telephoto end. Table 3 illustrates the zoom lens according to the third embodiment where surface number 6, 7, 15, and 20 are aspheric surfaces expressed by Expression 1. The zoom lens of the third embodiment is a five-unit zoom lens including positive, negative, positive, positive, positive lens units.

The zoom lens introduces a light flux incident at each angle of view to an aperture diaphragm AP via a first lens unit G1 having a positive power and second lens unit G2 having a negative power so as to limit a light flux width, and forms an image on an image sensing surface via a third lens unit G3, a fourth lens unit G4, and a fifth lens unit G5 each having a positive power. In addition, intervals among the first to fifth lens units are made variable so as to change a focal length between 4.8 mm and 44.7 mm for a 9.3× zoom lens.

In a zoom lens that has a high magnification of 5 times or higher as in this embodiment, the negative lens unit placed before the aperture diaphragm, such as the second lens unit G2, serves as a variator. In this case, increasing the negative power can widen a variable range of the focal length and provide a high zooming ratio.

However, the increased negative power causes a large amount of chromatic aberrations, and it is particularly difficult to reconcile a reduction of the lateral chromatic aberration at the wide-angle end with a reduction of the longitudinal chromatic aberration at the telephoto end. Accordingly, this embodiment provides the gradient-index lens GR1 to the second lens unit that serves as the variator, and provides the refractive index distribution shape in which the refractive index wavelength dispersion decreases as the distance from the optical system increases, so as to properly correct the chromatic aberration that occurs in the second lens unit in the negative direction.

When the chromatic aberration that occurs in the lens unit is corrected in that lens unit, it becomes easy to simultaneously correct the lateral chromatic aberration and the longitudinal chromatic aberration. In addition, similar to the first and second embodiments, the gradient-index lens GR1 is a biconcave lens having a concave incident surface and a concave exit surface, where the incident surface is more sharply curved than the exit surface.

Figure 14:
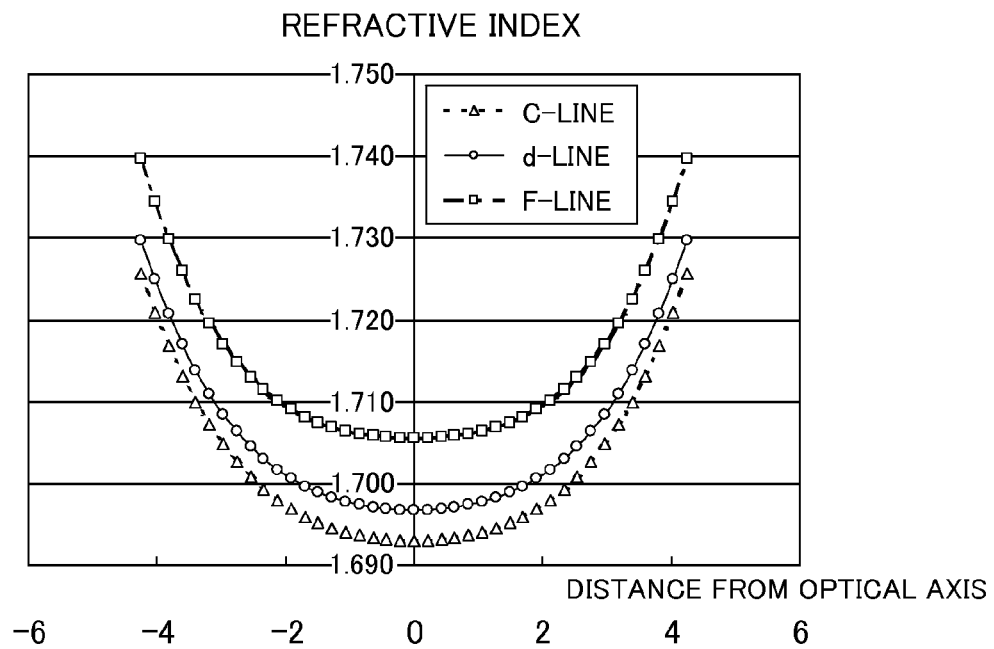
FIG. 14 is a graph illustrating a refractive index distribution shape of a gradient-index lens illustrated in FIGS. 13A to 13C according to the third embodiment.

FIG. 14 is a graph illustrating a refractive index distribution shape of the gradient-index lens GR1. As illustrated in FIG. 14, the gradient-index lens GR1 has a refractive index distribution in which the refractive index for each wavelength (the C-line, the d-line, and the F-line) increases as a distance from the optical axis increases. A change amount of the refractive index for the C-line on the short wavelength side is made larger than that for the F-line on the long wavelength side near the optical axis, and the refractive index wavelength dispersion is made smaller as the distance from the optical axis increases.

Figure 15:
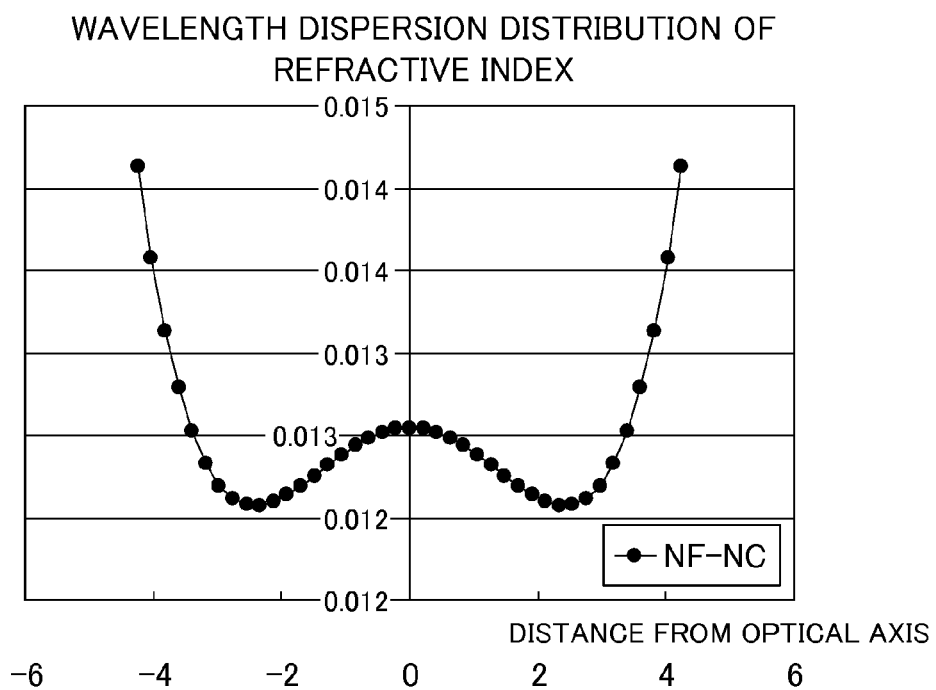
FIG. 15 is a graph illustrating a wavelength dispersion distribution shape of a refractive index of the gradient-index lens illustrated in FIGS. 13A to 13C according to the third embodiment.

FIG. 15 is a graph illustrating a wavelength dispersion distribution shape of the refractive index of the gradient-index lens GR1. The refractive index wavelength dispersion is made smaller near the optical axis of the gradient-index lens GR1 as the distance from the light axis increases, and the refractive index wavelength dispersion is made larger as the distance from the optical axis increases on the peripheral side of inflection points.

In other words, a wavelength dispersion of a refractive index decreases as the distance from the optical axis increases in a first region that contains the optical axis, and the wavelength dispersion of the refractive index increases as the distance from the optical axis increases in a second region that is more distant from the optical axis than the first region.

Thereby, even when the wavelength dispersion distribution is formed in the lens in which the thickness of the lens significantly changes according to a distance from the optical axis, the chromatic aberration can be properly corrected while the excessive correction is prevented. In particular, this configuration is effective when the periphery of the lens is twice as thick as a portion of the lens on the optical axis or higher.

Figure 16:
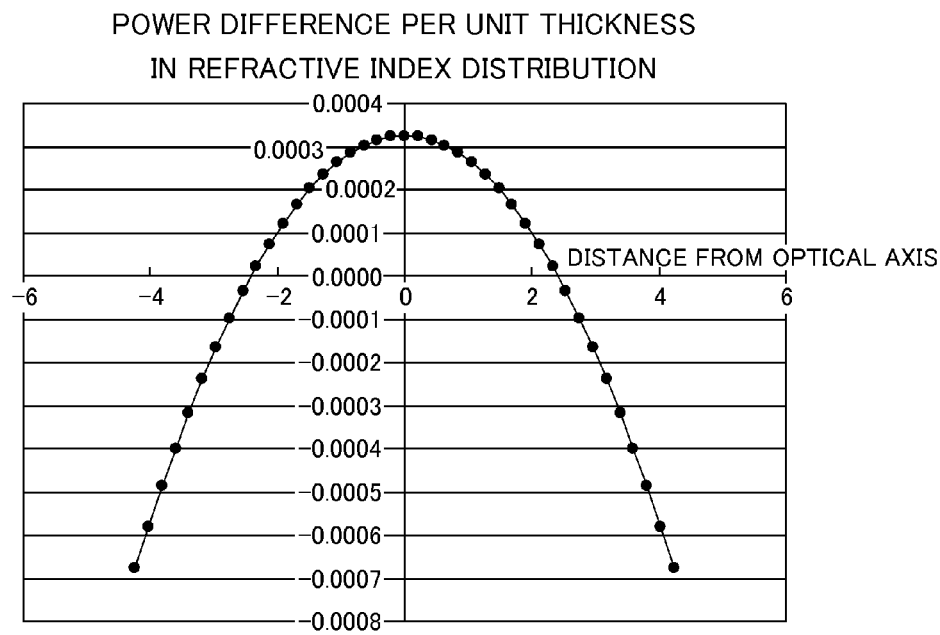
FIG. 16 is a graph illustrating a refractive index distribution power difference per unit thickness of the gradient-index lens illustrated in FIGS. 13A to 13C according to the third embodiment.

FIG. 16 is a graph illustrating the difference per unit thickness between the power for the F-line and the power for the C-line in the refractive index distribution of the gradient-index lens GR1. The difference per unit thickness between the power for the F-line and the power for the C-line is made positive on the optical axis in the refractive index distribution so as to generate the chromatic aberration in the positive direction, and to correct the chromatic aberration that occurs in the negative direction of the second lens unit G2.

The difference per unit thickness between the power for the F-line and the power for the C-line in the refractive index distribution is gradually decreased as a distance from the optical axis increases so as to correct the influences of the thickness changes of the concave shape of the gradient-index lens GR1 and to highly precisely correct the chromatic aberration.

In other words, it is the wavelength dispersion distribution in which the differential value with the wavelength, of the power per unit thickness in the refractive index distribution is negative on the optical axis, the above differential value increases as the distance from the optical axis increases, and the differential value turns into a positive value from the optical axis to the periphery.

Even in this embodiment, the gradient-index lens GR1 has a wavelength dispersion distribution in which the differential value with the wavelength, of the power per unit thickness in the refractive index distribution increases as the distance from the optical axis increases.

When a gradient-index lens is arranged in the lens unit that includes a plurality of lenses as in this embodiment, a wavelength dispersion distribution shape having an inflection point can be formed and a change amount of the wavelength dispersion distribution can be maintained small by adjusting a correction amount of the chromatic aberration among the gradient-index lens and other lenses.

Thereby, the chromatic aberration can be appropriately corrected even when the wavelength dispersion distribution is formed in the lens in which the thickness of the lens significantly changes according to the distance from the optical axis.

Figure 17:
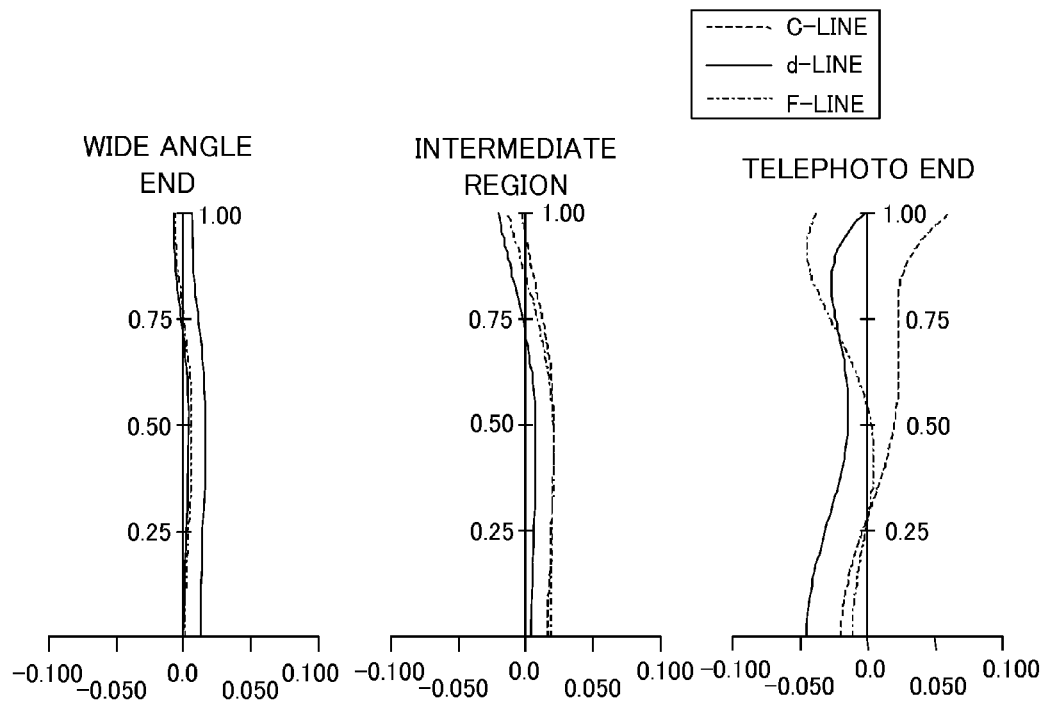
FIG. 17 illustrates longitudinal aberrational diagrams of the zoom lens illustrated in FIGS. 13A to 13C according to the third embodiment.

FIG. 17 illustrates longitudinal aberration diagrams of the zoom lens according to this embodiment at the wide-angle end, in the intermediate range, and at the telephoto end. As illustrated, the longitudinal chromatic aberration is well corrected at any zoom positions while the spherical aberration of the color is restrained.

Figure 18:
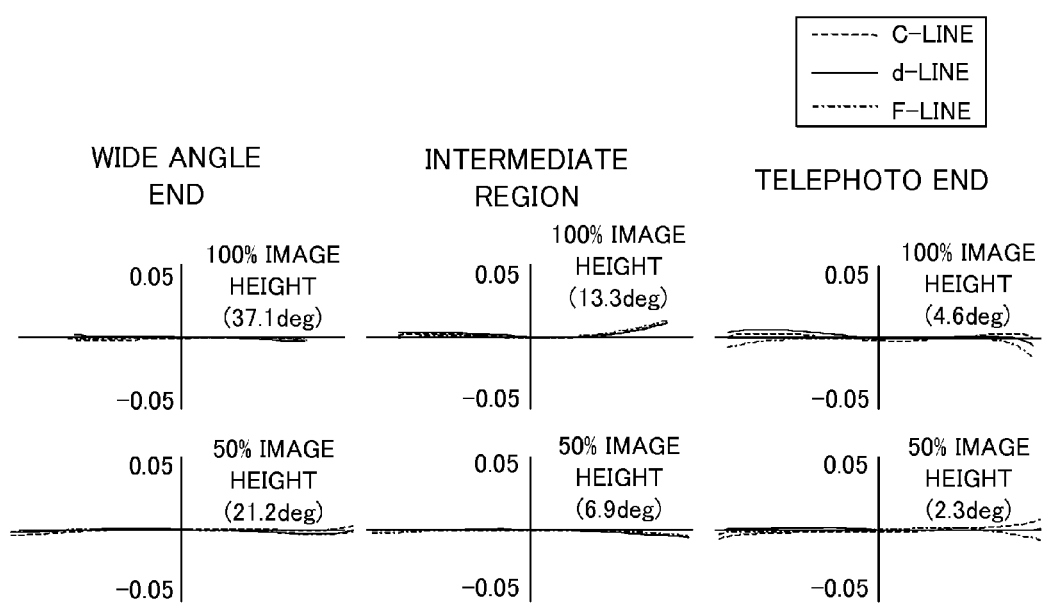
FIG. 18 illustrates transverse aberrational diagrams of the zoom lens illustrated in FIGS. 13A to 13C according to the third embodiment.

FIG. 18 illustrates transverse aberration diagrams of the zoom lens according to this embodiment at the wide-angle end, in the intermediate range, and at the telephoto end. As illustrated, the lateral chromatic aberration is well corrected at each image height, while the curvature of field of the color is restrained. Thereby, the chromatic aberration that occurs in the second lens unit G2 in the negative direction can be satisfactorily corrected.

At the wide-angle end, a reduction of the lateral chromatic aberration can be reconciled with a reduction of the curvature of field of the color. At the telephoto end, a reduction of the longitudinal chromatic aberration can be reconciled with a reduction of the spherical aberration of the color. Such highly precise corrections of the chromatic aberrations can be realized. In addition, similar to the first and second embodiments, the gradient-index lens GR1 has a concave incident surface.

TABLE 3

OPTICAL CONFIGURATION

| configuration | Surface Number | Surface Shape | Radius of Curvature | Interval between Surfaces | Refractive Index Nd | Abbe Number Vd |
|---|---|---|---|---|---|---|
| First Lens Unit | 1 | spherical | 27.3030 | 0.800 | 1.84666 | 23.7 |
| | 2 | spherical | 19.8485 | 4.180 | 1.49700 | 81.5 |
| | 3 | spherical | −158.5394 | 0.150 | Air | |
| | 4 | spherical | 25.4611 | 2.300 | 1.72916 | 54.6 |
| | 5 | spherical | 55.1451 | variable d5 | Air | |

TABLE 3-continued

| | | | | | | |
|---|---|---|---|---|---|---|
| Second Lens Unit | 6 | aspheric | 78.3435 | 1.000 | 1.80610 | 40.9 |
| | 7 | aspheric | 5.7066 | 3.368 | Air | |
| | 8 | spherical | −7.2135 | 0.600 | GR1 | |
| | 9 | spherical | 19.2767 | 0.200 | Air | |
| | 10 | spherical | 14.6744 | 1.430 | 1.75520 | 27.5 |
| | 11 | spherical | −15.5007 | variable d11 | Air | |
| Aperture Diaphragm | 12 | spherical | plane | 0.300 | Air | |
| Third Lens Unit | 13 | spherical | 5.0395 | 1.889 | 1.48749 | 70.2 |
| | 14 | spherical | −117.7095 | 1.375 | Air | |
| | 15 | aspheric | 9.0035 | 1.535 | 1.80610 | 40.9 |
| | 16 | spherical | −71.7095 | 0.600 | 1.84666 | 23.7 |
| | 17 | spherical | 5.9521 | variable d17 | Air | |
| Fourth Lens Unit | 18 | spherical | 8.3588 | 1.400 | 1.48749 | 70.2 |
| | 19 | spherical | 10.8594 | variable d19 | Air | |
| Fifth Lens Unit | 20 | aspheric | 5.1976 | 1.124 | 1.51760 | 63.5 |
| | 21 | spherical | 8.2241 | variable d21 | Air | |
| Filter | 22 | spherical | plane | 0.780 | 1.51680 | 64.1 |
| | 23 | spherical | plane | 0.100 | Air | |
| Image Plane | 24 | spherical | plane | | | |

VARIABLE SURFACE INTERVAL

| Surface Interval Number | Wide-angle End | Intermediate region | Telephoto End |
|---|---|---|---|
| d5 | 0.100 | 9.495 | 15.304 |
| d11 | 15.692 | 5.955 | 0.100 |
| d17 | 0.167 | 0.208 | 13.417 |
| d19 | 6.571 | 7.975 | 4.087 |
| d21 | 1.340 | 3.714 | 3.962 |

MATERIAL

| Material Name | Refractive Index Distrib. Coeffi. | wavelength | | |
|---|---|---|---|---|
| | | C-Line: 656.27 nm | d-Line: 587.56 nm | F-Line: 486.13 nm |
| GR1 | N00 | 1.69297 | 1.69680 | 1.70552 |
| | N10 | 0.8854E−03 | 0.8354E−03 | 0.7228E−03 |
| | N20 | 0.5161E−04 | 0.5539E−04 | 0.6554E−04 |

ASPHERIC SHAPE

| Surface Number | K | A | B | C | D |
|---|---|---|---|---|---|
| 6 | 0.0000 | −1.2721E−04 | 1.3401E−05 | −2.5030E−07 | 1.7497E−09 |
| 7 | 0.0000 | −3.4484E−04 | 4.4490E−06 | 8.0874E−07 | 1.1279E−09 |
| 15 | 0.0000 | −1.1883E−03 | −3.1269E−05 | −4.8227E−06 | 3.5968E−08 |
| 20 | 0.0000 | −2.0069E−04 | −2.7381E−05 | 1.6494E−06 | −5.5142E−08 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-191504, filed Sep. 2, 2011 which is hereby incorporated by reference herein in its entirety.

What is claimed is:

1. A zoom lens comprising:
an aperture diaphragm; and
a plurality of lens units including a negative lens unit arranged on a light incident side of the aperture diaphragm, the zoom lens being configured to make variable a focal length by changing an interval among the plurality of lens units, wherein the negative lens unit includes a negative lens having a radial type refractive index distribution and a concave surface on the light incident side, and wherein the negative lens has a wavelength dispersion distribution in which a difference per unit thickness between a power for a F-line and a power for a C-line in a refractive index distribution of a gradient-index defined by the following expression is positive on an optical axis of the zoom lens, and the difference per unit thickness monotonously decreases as a distance from the optical axis increases:

$$\Delta \partial \phi_{N,FC} = -2(N_{10,F}-N_{10,C})-4(N_{20,F}-N_{20,C})r^2 - 6(N_{30,F}-N_{30,C})r^4-8(N_{40,F}-N_{40,C})r^6,$$

where a value $\Delta\partial\phi_{N,FC}$ is the difference per unit thickness, r is the distance from the optical axis in a radial direction of the negative lens, $N_{10,F}$, $N_{20,F}$, $N_{30,F}$, and $N_{40,F}$ are power series coefficients of the radial type refractive index distribution for the F-line given by the following expression, and $N_{10,C}$, $N_{20,C}$, $N_{30,C}$, and $N_{40,C}$ are power series coefficients of the radial type refractive index distribution for the C-line given by the following expression:

$$N_F(r)=N_{00,F}+N_{10,F}r^2+N_{20,F}r^4+N_{30,F}r^6+N_{40,F}r^8, \text{ and}$$

$$N_C(r)=N_{00,C}+N_{10,C}r^2+N_{20,C}r^4+N_{30,C}r^6+N_{40,C}r^8,$$

where $N_{00,F}$ is a refractive index on the optical axis of the negative lens for the F-line, $N_{00,C}$ is a refractive index on the optical axis of the negative lens for the C-line, $N_F(r)$ is the radial type of refractive index distribution for the F-line, and $N_C(r)$ is the radial type of refractive index distribution for the C-line.

2. The zoom lens according to claim 1, wherein the negative lens has a refractive index distribution shape in which a refractive index decreases as the distance from the optical axis increases.

3. The zoom lens according to claim 1, wherein in the wavelength dispersion distribution, a wavelength dispersion of a refractive index decreases as the distance from the optical axis increases in a first region that contains the optical axis of the negative lens, and the wavelength dispersion of the refractive index decreases as the distance from the optical axis increases in a second region that is more distant from the optical axis than the first region.

4. A zoom lens comprising:
an aperture diaphragm; and
a plurality of lens units including a negative lens unit arranged on an enlargement conjugate side of the aperture diaphragm, the zoom lens being configured to make variable a focal length by changing an interval among the plurality of lens units,
wherein the negative lens unit includes a negative lens having a radial type refractive index distribution and a concave surface on the enlargement conjugate side, and
wherein the negative lens has a wavelength dispersion distribution in which a difference per unit thickness between a power for a F-line and a power for a C-line in a refractive index distribution of a gradient-index defined by the following expression is positive on an optical axis of the zoom lens, and the difference per unit thickness monotonously decreases as a distance from the optical axis increases:

$$\Delta\partial\phi_{N,FC}=-2(N_{10,F}-N_{10,C})-4(N_{20,F}-N_{20,C})r^2-6(N_{30,F}-N_{30,C})r^4-8(N_{40,F}-N_{40,C})r^6,$$

where a value $\Delta\partial\phi_{N,FC}$ is the difference per unit thickness, r is the distance from the optical axis in a radial direction of the negative lens, $N_{10,F}$, $N_{20,F}$, $N_{30,F}$, and $N_{40,F}$ are power series coefficients of the radial type refractive index distribution for the F-line given by the following expression, and $N_{10,C}$, $N_{20,C}$, $N_{30,C}$, and $N_{40,C}$ are power series coefficients of the radial type refractive index distribution for the C-line given by the following expression:

$$N_F(r)=N_{00,F}+N_{10,F}r^2+N_{20,F}r^4+N_{30,F}r^6+N_{40,F}r^8, \text{ and}$$

$$N_C(r)=N_{00,C}+N_{10,C}r^2+N_{20,C}r^4+N_{30,C}r^6+N_{40,C}r^8,$$

where $N_{00,F}$ is a refractive index on the optical axis of the negative lens for the F-line, $N_{00,C}$ is a refractive index on the optical axis of the negative lens for the C-line, $N_F(r)$ is the radial type of refractive index distribution for the F-line, and $N_C(r)$ is the radial type of refractive index distribution for the C-line.

5. The zoom lens according to claim 4, wherein the negative lens has a refractive index distribution shape in which a refractive index decreases as the distance from the optical axis increases.

6. The zoom lens according to claim 4, wherein in the wavelength dispersion distribution, a wavelength dispersion of a refractive index decreases as the distance from the optical axis increases in a first region that contains the optical axis of the negative lens, and the wavelength dispersion of the refractive index decreases as the distance from the optical axis increases in a second region that is more distant from the optical axis than the first region.

7. An optical apparatus comprising:
an image sensor; and
a zoom lens configured to guide light from an object to the image sensor,
wherein the zoom lens comprises:
an aperture diaphragm; and
a plurality of lens units including a negative lens unit arranged on a light incident side of the aperture diaphragm, the zoom lens being configured to make variable a focal length by changing an interval among the plurality of lens units,
wherein the negative lens unit includes a negative lens having a radial type refractive index distribution and a concave surface on the light incident side, and
wherein the negative lens has a wavelength dispersion distribution in which a difference per unit thickness between a power for a F-line and a power for a C-line in a refractive index distribution of a gradient-index defined by the following expression is positive on an optical axis of the zoom lens, and the difference per unit thickness monotonously decreases as a distance from the optical axis increases:

$$\Delta\partial\phi_{N,FC}=-2(N_{10,F}-N_{10,C})-4(N_{20,F}-N_{20,C})r^2-6(N_{30,F}-N_{30,C})r^4-8(N_{40,F}-N_{40,C})r^6,$$

where a value $\Delta\partial\phi_{N,FC}$ is the difference per unit thickness, r is the distance from the optical axis in a radial direction of the negative lens, $N_{10,F}$, $N_{20,F}$, $N_{30,F}$, and $N_{40,F}$ are power series coefficients of the radial type refractive index distribution for the F-line given by the following expression, and $N_{10,C}$, $N_{20,C}$, $N_{30,C}$, and $N_{40,C}$ are power series coefficients of the radial type refractive index distribution for the C-line given by the following expression:

$$N_F(r)=N_{00,F}+N_{10,F}r^2+N_{20,F}r^4+N_{30,F}r^6+N_{40,F}r^8, \text{ and}$$

$$N_C(r)=N_{00,C}+N_{10,C}r^2+N_{20,C}r^4+N_{30,C}r^6+N_{40,C}r^8,$$

where $N_{00,F}$ is a refractive index on the optical axis of the negative lens for the F-line, $N_{00,C}$ is a refractive index on the optical axis of the negative lens for the C-line, $N_F(r)$ is the radial type of refractive index distribution for the F-line, and $N_C(r)$ is the radial type of refractive index distribution for the C-line.

8. An optical apparatus comprising:
an image display element; and
a zoom lens configured to project light from the image display element to an enlargement conjugate side,
wherein the zoom lens comprises:
an aperture diaphragm; and
a plurality of lens units including a negative lens unit arranged on the enlargement conjugate side of the aperture diaphragm, the zoom lens being configured to make variable a focal length by changing an interval among the plurality of lens units, wherein the negative lens unit includes a negative lens having a radial type refractive index distribution and a concave surface on the enlargement conjugate side, and wherein the negative lens has a wavelength dispersion distribution in which a difference per unit thickness between a power for a F-line and a power for a C-line in a refractive index distribution of a gradient-index defined by the following expression is positive on an optical axis of the zoom lens, and the difference per unit thickness monotonously decreases as a distance from the optical axis increases:

$$\Delta\partial\phi_{N,FC} = -2(N_{10,F}-N_{10,C}) - 4(N_{20,F}-N_{20,C})r^2 - 6(N_{30,F}-N_{30,C})r^4 - 8(N_{40,F}-N_{40,C})r^6,$$

where a value $\Delta\partial\phi_{N,FC}$ is the difference per unit thickness, r is the distance from the optical axis in a radial direction of the negative lens, $N_{10,F}$, $N_{20,F}$, $N_{30,F}$, and $N_{40,F}$ are power series coefficients of the radial type refractive index distribution for the F-line given by the following expression, and $N_{10,C}$, $N_{20,C}$, $N_{30,C}$, and $N_{40,C}$ are power series coefficients of the radial type refractive index distribution for the C-line given by the following expression:

$$N_F(r) = N_{00,F} + N_{10,F}r^2 + N_{20,F}r^4 + N_{30,F}r^6 + N_{40,F}r^8, \text{ and}$$

$$N_C(r) = N_{00,C} + N_{10,C}r^2 + N_{20,C}r^4 + N_{30,C}r^6 + N_{40,C}r^8,$$

where $N_{00,F}$ is a refractive index on the optical axis of the negative lens for the F-line, $N_{00,C}$ is a refractive index on the optical axis of the negative lens for the C-line, $N_F(r)$ is the radial type of refractive index distribution for the F-line, and $N_C(r)$ is the radial type of refractive index distribution for the C-line.

* * * * *